United States Patent
Fan et al.

(10) Patent No.: US 12,483,145 B2
(45) Date of Patent: Nov. 25, 2025

(54) RESONANT POWER SUPPLY, PRIMARY-SIDE FEEDBACK EXCITATION POWER SUPPLY CONTROLLER, METHOD, AND CONTROL APPARATUS

(71) Applicant: HUAWEI TECHNOLOGIES CO., LTD., Guangdong (CN)

(72) Inventors: Wingto Fan, Dongguan (CN); Shuangquan Chen, Shenzhen (CN); Weiliang Shu, Dongguan (CN); Yunhe Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 18/343,899

(22) Filed: Jun. 29, 2023

(65) Prior Publication Data
US 2023/0361685 A1 Nov. 9, 2023

Related U.S. Application Data

(63) Continuation of application No. PCT/CN2021/125072, filed on Oct. 20, 2021.

(30) Foreign Application Priority Data

Dec. 31, 2020 (CN) .......................... 202011637004.2

(51) Int. Cl.
*H02M 3/335* (2006.01)
*H02M 3/00* (2006.01)

(52) U.S. Cl.
CPC ......... *H02M 3/33569* (2013.01); *H02M 3/01* (2021.05)

(58) Field of Classification Search
CPC .............................. H02M 3/33569; H03M 3/01
See application file for complete search history.

(56) References Cited

U.S. PATENT DOCUMENTS 8,842,449 B1 * 9/2014 Tong ................... H02M 3/3376
363/21.02
9,203,318 B2 12/2015 Scibilia
(Continued)

FOREIGN PATENT DOCUMENTS

CN 101893682 A 11/2010
CN 106026673 A 10/2016
(Continued)

OTHER PUBLICATIONS

Liang Tsorng-Juu et al: "Design and Implementation of Half-Bridge Resonant Converter With Novel Primary-Side Control", IEEE Transactions on Power Electronics, Institute of Electrical and Electronics Engineers, USA, vol. 35, No. 5, Sep. 26, 2019, total 9 pages, XP011774696.
(Continued)

*Primary Examiner* — Harry R Behm
(74) *Attorney, Agent, or Firm* — WOMBLE BOND DICKINSON (US) LLP

(57) ABSTRACT

A resonant power supply, a primary-side feedback excitation power supply controller, a method, and a control apparatus are disclosed. In the resonant power supply, a bridge circuit is electrically connected to a power supply. The bridge circuit is configured to convert, based on a drive signal, a direct current provided by the power supply into a square wave signal. An LC series resonant network is electrically connected to the bridge circuit and a primary-side winding. The LC series resonant network is configured to convert the square wave signal into an alternating current, and output the alternating current to the primary-side winding. The alternating current includes an input voltage $V_t$ and an input current $I_r$.

20 Claims, 12 Drawing Sheets

(56) References Cited

U.S. PATENT DOCUMENTS

| | | | |
|---|---|---|---|
| 9,331,591 B2 | 5/2016 | Leisten | |
| 2016/0197556 A1* | 7/2016 | Ivankovic | H02M 3/335 363/17 |
| 2018/0309373 A1* | 10/2018 | Chang | H02M 3/01 |
| 2024/0171080 A1* | 5/2024 | Hirokawa | H02M 1/0009 |

FOREIGN PATENT DOCUMENTS

| | | |
|---|---|---|
| CN | 106602918 A | 4/2017 |
| DE | 102012224212 A1 | 6/2014 |

OTHER PUBLICATIONS

Dong Hanjing et al: "Primary-Side Regulation Scheme for LLC Resonant Converter With Improved Resonant Current Sampling Circuit", IEEE Transactions on Power Electronics, Institute of Electrical and Electronics Engineers,USA,vol. 36,No. 2,Jul. 7, 2020,total 5 pages,XP011811931.

Sen Lin,"Research on a high power factor and primary side controlled LLC resonant LED driver",Mar. 2018,with English abstract total 90 pages.

* cited by examiner

RESONANT POWER SUPPLY, PRIMARY-SIDE FEEDBACK EXCITATION POWER SUPPLY CONTROLLER, METHOD, AND CONTROL APPARATUS

CROSS-REFERENCE TO RELATED APPLICATIONS

This application is a continuation of International Application No. PCT/CN2021/125072, filed on Oct. 20, 2021, which claims priority to Chinese Patent Application No. 202011637004.2, filed on Dec. 31, 2020. The disclosures of the aforementioned applications are hereby incorporated by reference in their entireties.

TECHNICAL FIELD

This application relates to the field of power supply technologies, and in particular, to a resonant power supply, a primary-side feedback excitation power supply controller, a method, and a control apparatus.

BACKGROUND

At present, motors are widely used in the industry of electronic and automated devices. In a brushless excitation synchronous motor, an excitation winding is used to replace permanent magnet to provide a constant magnetic field on a rotating shaft, to improve the efficiency of the motor under a high-speed working condition and reduce the dependence on rare earth. Moreover, in the brushless excitation synchronous motor, a resolver is also used to replace an electric slip ring to supply power to the excitation winding.

To control output characteristics, such as a rotation speed and output power, of the brushless excitation synchronous motor, a current and a voltage output by the resolver may be collected, to control a circuit electrically connected to a primary side of the resolver, and implement closed-loop control on an electrical signal output by the resolver. However, a secondary side of the resolver is connected to the excitation winding and therefore, operates at a high speed with the excitation winding. In this case, a large quantity of detections and a communication circuit need to be added on the secondary side of the resolver, resulting in a large quantity of components and a complex circuit on the secondary side of the resolver. During high-speed rotation, a secondary-side circuit of the resolver generates a large centrifugal force. Heat generated by the centrifugal force, the rotating shaft, and a motor body may affect the reliability of the secondary-side circuit of the resolver.

SUMMARY

This application provides a resonant power supply, a primary-side feedback excitation power supply controller, a method, and a control apparatus, to simplify a secondary-side circuit of a resolver in a process of controlling a current and a voltage output by the resolver.

To achieve the foregoing objective, the following technical solutions are used in this application.

In some embodiments, a resonant power supply is provided. The resonant power supply includes a transformer, a bridge circuit, an LC (inductor (L) capacitor (C)) series resonant network, a rectifier bridge, and a primary-side feedback excitation power supply controller. The transformer includes a primary-side winding and a secondary-side winding. The bridge circuit is electrically connected to a power supply. The bridge circuit is configured to convert, based on a drive signal, a direct current provided by the power supply into a square wave signal. The LC series resonant network is electrically connected to the bridge circuit and the primary-side winding. The LC series resonant network is configured to convert the square wave signal into an alternating current, and output the alternating current to the primary-side winding. The alternating current includes an input voltage $V_t$ and an input current $I_r$. The rectifier bridge is electrically connected to the secondary-side winding, and the rectifier bridge is configured to convert the alternating current on the secondary-side winding into a direct current. The primary-side feedback excitation power supply controller is electrically connected to the primary-side winding, the bridge circuit, and the LC series resonant network. The primary-side feedback excitation power supply controller is configured to receive the input voltage $V_t$ and the input current $I_r$, and output the drive signal to the bridge circuit. The drive signal may be for driving the rectifier bridge to convert the alternating current on the secondary-side winding into the direct current. In this way, the primary-side feedback excitation power supply controller can receive the input voltage $V_t$ and the input current $I_r$, and output the drive signal to the bridge circuit, to perform closed-loop control on the bridge circuit, and adjust the frequency and duty cycle of an output signal of the bridge circuit to matching target values. In this way, the output voltage and the output current of the resonant power supply can match target values. In addition, the primary-side feedback excitation power supply controller is electrically connected to the primary-side winding, to simplify a structure of the secondary-side circuit in the transformer, and prevent the primary-side feedback excitation power supply controller from being affected by a high eccentricity and a high temperature when the primary-side feedback excitation power supply controller operates at a high speed with the rotating shaft.

In some embodiments, that the primary-side feedback excitation power supply controller is configured to receive the input voltage $V_t$ and the input current $I_r$, and output the drive signal to the bridge circuit includes: The primary-side feedback excitation power supply controller is configured to calculate an excitation inductance $L_{m.est}$, calculate an output voltage $V_{o.est}$ and an output current $I_{o.est}$ of the resonant power supply based on the input voltage $V_t$, the input current $I_r$, a leakage inductance $L_{lk1}$ of the primary-side winding, and the calculated excitation inductance $L_{m.est}$, and output the drive signal to the bridge circuit. In this way, the output voltage $V_{o.est}$ and the output current $I_{o.est}$ of the resonant power supply can be calculated by the primary-side feedback excitation power supply controller, to control output characteristics, such as a rotation speed and output power, of the brushless excitation synchronous motor. In addition, the primary-side feedback excitation power supply controller can output the drive signal to the bridge circuit based on the output voltage $V_{o.est}$ and the output current $I_{o.est}$, to perform closed-loop control on the bridge circuit, and adjust the frequency and duty cycle of an output signal of the bridge circuit to matching target values.

In some embodiments, the primary-side feedback excitation power supply controller includes a sampling circuit, a feedback circuit, and a primary-side control circuit. The collection circuit is electrically connected to the primary-side winding, and is configured to collect the input voltage $V_t$ and the input current $I_r$. The feedback circuit is electrically connected to the collection circuit, and is configured to calculate an excitation voltage $V_{m.est}$, an excitation current $I_{m.est}$, and a primary-side current $I_{pri.est}$ based on the input voltage $V_r$, the input current $I_r$, the leakage inductance $L_{lk1}$ of the primary-side winding, and the calculated excitation inductance $L_{m.est}$, and calculate the output voltage $V_{o.est}$ and the output current $I_{o.est}$ of the resonant power supply based on the excitation voltage $V_{m.est}$ and the primary-side current $I_{pri.est}$ that are calculated, where $$V_{m.est} = V_t - L_{lk1}\frac{dI_r}{dt};$$

$$I_{m.est} = \frac{1}{L_{m.est}}\int V_{m.est}dt; \text{ and}$$

$$I_{pri.est} = I_r - I_{m.est}.$$

In addition, the primary-side control circuit is electrically connected to the feedback circuit and the bridge circuit, and is configured to calculate the excitation inductance $L_{m.est}$, and transmit the leakage inductance $L_{lk1}$ of the primary-side winding and the calculated excitation inductance $L_{m.est}$ to the feedback circuit. Since the excitation current $I_{m.est}$ and the primary-side current $I_{pri.est}$ are related to the calculated excitation inductance $L_{m.est}$, a value of an actual excitation inductance $L_m$ changes greatly with a change of an air gap distance, and therefore, differs from the calculated excitation inductance $L_{m.est}$. Therefore, the excitation inductance $L_{m.est}$ may be calculated by the primary-side control circuit based on a requirement, to correct the excitation inductance $L_{m.est}$ in real time, so that values of the primary-side current $I_{pri.est}$ and the excitation inductance $L_{m.est}$ that are calculated by the feedback circuit are more accurate, which is beneficial to improving the precision of the output voltage $V_{o.est}$ and the output current $I_{o.est}$ of the resonant power supply that are calculated and that are finally obtained.

In some embodiments, an inductance value of a resonant inductor in the LC series resonant network is $L_r$, and a capacitance value of a resonant capacitor is $C_r$. The primary-side control circuit is further configured to calculate an oscillation frequency $f_r$ of the bridge circuit, where $$f_r = \frac{1}{2\pi\sqrt{(L_r + L_{lk1})C_r}}.$$

That the primary-side control circuit is configured to calculate the excitation inductance $L_{m.est}$ includes: The primary-side control circuit is configured to compare a working frequency $f_{sw}$ of the bridge circuit with the oscillation frequency $f_r$, and compare, when $f_{sw} < f_r$, in a collection phase $T_{cal}$ in one switching cycle T of the bridge circuit, an absolute value $|I_{m.est}|$ of the excitation current calculated by the feedback circuit in the current switching cycle T of the bridge circuit with an absolute value $|I_r|$ of the input current. When $|I_{m.est}| > |I_r|$, the excitation inductance $L_{m.est}$ received by the feedback circuit in the current switching cycle T of the bridge circuit is increased, to achieve $|I_{m.est}|=|I_r|$, and the excitation inductance $L_{m.est}$ is output to the feedback circuit. In this way, when the primary-side controller determines that $|I_{m.est}| > |I_r|$, the primary-side controller may increase the excitation inductance $L_{m.est}$ received by the feedback circuit in the current switching cycle T of the bridge circuit, to enable the excitation current $I_{m.est}$ calculated by the feedback circuit to be the same as or approximately the same as an actual excitation current $I_{m.true}$, to achieve $|I_{m.est}|=|I_r|$. Further the primary-side current $I_{pri.est}$ calculated by the feedback circuit is zero, and is the same as an actual primary-side current $I_{pri}$. In addition, when $|I_{m.est}| < |I_r|$, the excitation inductance $L_{m.est}$ received by the feedback circuit in the current switching cycle T of the bridge circuit is decreased, to achieve $|I_{m.est}|=|I_r|$, and the excitation inductance $L_{m.est}$ is output to the feedback circuit. In this way, when the primary-side controller determines that $|I_{m.est}| < |I_r|$, the primary-side controller may decrease the excitation inductance $L_{m.est}$ received by the feedback circuit in the current switching cycle T of the bridge circuit. Further, the primary-side current $I_{pri.est}$ calculated by the feedback circuit is zero, and is the same as an actual primary-side current $I_{pri}$. When $|I_{m.est}|=|I_r|$, the excitation inductance $L_{m.est}$ received by the feedback circuit in the current switching cycle T of the bridge circuit is output to the feedback circuit. $T_{cal}=T/2-I_r/2$, and $T_f=1/f_r$. In this way, when the primary-side controller determines that $|I_{m.est}|=|I_r|$, the primary-side current $I_{pri.est}$ calculated by the feedback circuit is zero, and is the same as the actual primary-side current $I_{pri}$. In this case, the excitation inductance $L_{m.est}$ calculated by the primary-side controller is the same as or approximately the same as the actual excitation inductance. Therefore, the primary-side controller may output an excitation inductance $L_{m.est}$ provided to the feedback circuit last time to the feedback circuit again, to over-correct the excitation inductance $L_{m.est}$.

In some embodiments, that the primary-side control circuit is configured to calculate the excitation inductance $L_{m.est}$ includes: The primary-side control circuit is configured to output, when determining that the primary-side current $I_{pri.est}$ calculated by the feedback circuit is zero, the excitation inductance $L_{m.est}$ received by the feedback circuit in a current switching cycle T of the bridge circuit to the feedback circuit. In this way, when the primary side controller determines that the primary-side current $I_{pri.est}$ is zero, the primary-side current $I_{pri.est}$ is the same as the actual primary-side current $I_{pri}$. In this case, the excitation inductance $L_{m.est}$ calculated by the primary-side controller is the same as or approximately the same as the actual excitation inductance. Therefore, the primary-side controller may output an excitation inductance $L_{m.est}$ provided to the feedback circuit last time to the feedback circuit again, to over-correct the excitation inductance $L_{m.est}$.

In some embodiments, the feedback circuit includes: a voltage operation circuit, a current operation circuit, and an output voltage-current operation circuit. The voltage operation circuit is electrically connected to the collection circuit and the primary-side control circuit, and is configured to calculate the excitation voltage $V_{m.est}$ based on the input voltage $V_r$, the input current $I_r$, and the leakage inductance $L_{lk1}$ of the primary-side winding provided by the primary-side control circuit. The current operation circuit is electrically connected to the voltage operation circuit and the primary-side control circuit, and is configured to calculate the excitation current $I_{m.est}$ and the primary-side current $I_{pri.est}$ based on the excitation voltage $V_{m.est}$ and the excitation inductance $L_{m.est}$ that is calculated by the primary-side control circuit. The output voltage-current operation circuit is electrically connected to the voltage operation circuit, the current operation circuit, and the primary-side control circuit, and is configured to calculate the output voltage $V_{o.est}$ and the output current $I_{o.est}$ of the resonant power supply based on the excitation voltage $V_{m.est}$ and the primary-side current $I_{pri.est}$. In this way, the excitation voltage $V_{m.est}$ may be calculated by the voltage operation circuit, the excitation current $I_{m.est}$ and the primary-side current $I_{pri.est}$ may be calculated by the current operation circuit, and the output voltage $V_{o.est}$ and the output current $I_{o.est}$ may be calculated by the output voltage-current operation circuit.

In some embodiments, the voltage operation circuit includes a differentiator, a first operational amplifier, and a second operational amplifier. The differentiator is electrically connected to the collection circuit, and is configured to obtain a change rate of the input current $I_r$. The first operational amplifier is electrically connected to the differentiator and the primary-side control circuit, and is configured to multiply the change rate of the input current $I_r$ by the leakage inductance $L_{lk1}$ of the primary-side winding to obtain $L_{lk1} \times (dI_r/dt)$. The second operational amplifier is electrically connected to the first operational amplifier and the collection circuit, and is configured to calculate a difference between the input voltage $V_t$ and $L_{lk1}(dI_r/dt)$ output by the first operational amplifier, and use the difference as the excitation voltage $V_{m.est}$. The function of the voltage operation circuit may be implemented by hardware electronic components such as the differentiator, the first operational amplifier, and the second operational amplifier.

In some embodiments, the current operation circuit includes a third operational amplifier, an integrator, and a fourth operational amplifier. The third operational amplifier is electrically connected to the second operational amplifier and the primary-side control circuit, and is configured to obtain a product of a reciprocal of the excitation inductance $L_{m.est}$ calculated by the primary-side control circuit and the excitation voltage $V_{m.est}$. The integrator is electrically connected to the third operational amplifier, and is configured to perform integration on the excitation voltage $V_{m.est}$ to obtain the excitation current $I_{m.est}$. The fourth operational amplifier is electrically connected to the integrator and the collection circuit, and is configured to calculate a difference between the input current $I_r$ and the excitation current $I_{m.est}$ and use the difference as the primary-side current $I_{pri.est}$. In this way, the function of the current operation circuit may be implemented by hardware electronic components, such as the third operational amplifier, the integrator, and the fourth operational amplifier, included in the current operation circuit.

In some embodiments, the output voltage-current operation circuit includes: a fifth operational amplifier, a first low-pass filter, a sixth operational amplifier, a second low-pass filter, and an operational processing circuit. The fifth operational amplifier is electrically connected to the second operational amplifier and is configured to calculate an absolute value $|V_{m.est}|$ of the excitation voltage $V_{m.est}$. The first low-pass filter is electrically connected to the fifth operational amplifier, and is configured to calculate an average value $|V_{m.est}|_{avg}$ of the absolute value of the excitation voltage $V_{m.est}$. The sixth operational amplifier is electrically connected to the fourth operational amplifier, and is configured to calculate an absolute value $|I_{pri.est}|$ of the primary-side current $I_{pri.est}$. The second low-pass filter is electrically connected to the sixth operational amplifier, and is configured to calculate an average value $|I_{pri.est}|_{avg}$ of the absolute value of the primary-side current $I_{pri.est}$. The operational processing circuit is electrically connected to the fifth operational amplifier, the first low-pass filter, the sixth operational amplifier, and the second low-pass filter. When the primary-side control circuit determines that $f_{sw}=f_r$, the operational processing circuit is configured to calculate the output voltage $V_{o.est}$ and the output current $I_{o.est}$ of the resonant power supply based on an average value $|V_{m.est}|_{avg}$ of the absolute value of the excitation voltage $V_{m.est}$ in a switching cycle T of the bridge circuit, an average value $|I_{pri.est}|_{avg}$ of the absolute value of the primary-side current $I_{pri.est}$ in the switching cycle T of the bridge circuit, and a ratio K of turns of the primary-side winding to the secondary-side winding, where $$V_{o.est} = \frac{1}{K} \times |V_{ml}|, \text{ and } I_{o.est} = \frac{1}{K} \times |I_{pri.est}|_{avg}.$$

When the primary-side control circuit determines that $f_{sw}<f_r$, the operational processing circuit is configured to obtain, in a half of one switching cycle T of the bridge circuit, a peak $|I_{pri.est}|_{max}$ of the absolute value of the primary-side current $I_{pri.est}$ from a plurality of absolute values $|I_{pri.est}|$ of the primary-side current $I_{pri.est}$ and an absolute value $|V_{m1}|$ of an excitation voltage matching the peak $|I_{pri.est}|_{max}$, and calculate the output voltage $V_{o.est}$ and the output current $I_{o.est}$ of the resonant power supply based on the average value $|I_{pri.est}|_{avg}$ of the absolute value of the primary-side current $I_{pri.est}$ and a ratio K of turns of the primary-side winding to the secondary-side winding of the transformer, where $$V_{o.est} = \frac{1}{K} \times |V_{ml}|, \text{ and } I_{o.est} = \frac{1}{K} \times |I_{pri.est}|_{avg}.$$

In this way, the function of the output voltage-current operation circuit may be implemented by hardware electronic components such as the fifth operational amplifier, the first low-pass filter, the sixth operational amplifier, the second low-pass filter, and the operational processing circuit. In addition, the oscillation frequency $f_r$ of the bridge circuit is compared with the working frequency $f_{sw}$ of the bridge circuit, and the output voltage $V_{o.est}$ and the output current $I_{o.est}$ of the resonant power supply are calculated in different manners based on different comparison results, so that errors of the calculated output voltage $V_{o.est}$ and the calculated output current $I_{o.est}$ can be reduced, and high-precision primary-side feedback can be implemented.

In some embodiments, a primary-side feedback excitation power supply controller is provided. The primary-side feedback excitation power supply controller may be integrated in a chip. The primary-side feedback excitation power supply controller is electrically connected to a bridge circuit, an LC series resonant network, and a primary-side winding of a transformer that are in a resonant power supply. The primary-side feedback excitation power supply controller is configured to receive an input voltage $V_t$ and an input current $I_r$ that are provided by the LC series resonant network, and output a drive signal to the bridge circuit. The drive signal is for driving the bridge circuit to convert a direct current provided by a power supply into a square wave signal. The primary-side feedback excitation power supply controller has a same technical effect as that of the resonant power supply provided in the foregoing embodiment, and details are not described herein again.

In some embodiments, the primary-side feedback excitation power supply controller is configured to receive an input voltage $V_t$ and an input current $I_r$ that are provided by the LC series resonant network, and output a drive signal to the bridge circuit. The primary-side feedback excitation power supply controller is configured to calculate an excitation inductance $L_{m.est}$ and calculate an output voltage $V_{o.est}$ and an output current $I_{o.est}$ of the resonant power supply based on the input voltage $V_t$ and the input current $I_r$ that are provided by the LC series resonant network, a leakage inductance $L_{lk1}$ of the primary-side winding, and the calculated excitation inductance $L_{m.est}$. A technical effect of calculating, by the primary-side feedback excitation power supply controller, the output voltage $V_{o.est}$ and the output current $I_{o.est}$ of the resonant power supply is the same as that in the foregoing embodiment, and details are not described herein again.

In some embodiments, the primary-side feedback excitation power supply controller includes a sampling circuit, a feedback circuit, and a primary-side control circuit. The collection circuit is electrically connected to the primary-side winding, and is configured to collect the input voltage $V_t$ and the input current $I_r$. The feedback circuit is electrically connected to the collection circuit, and is configured to calculate an excitation voltage $V_{m.est}$, an excitation current $I_{m.est}$, and a primary-side current $I_{pri.est}$ based on the input voltage $V_t$, the input current $I_r$, the leakage inductance $L_{lk1}$ of the primary-side winding, and the calculated excitation inductance $L_{m.est}$, and calculate the output voltage $V_{o.est}$ and the output current $I_{o.est}$ of the resonant power supply based on the excitation voltage $V_{m.est}$ and the primary-side current $I_{pri.est}$ that are calculated, where $$V_{m.est} = V_t - L_{lk1}\frac{dI_r}{dt};$$

$$I_{m.est} = \frac{1}{L_{m.est}}\int V_{m.est}dt; \text{ and}$$

$$I_{pri.est} = I_r - I_{m.est}.$$

In addition, the primary-side control circuit is electrically connected to the feedback circuit and the bridge circuit, and is configured to calculate the excitation inductance $L_{m.est}$, and transmit the leakage inductance $L_{lk1}$ of the primary-side winding and the calculated excitation inductance $L_{m.est}$ to the feedback circuit. Technical effects of the sampling circuit, the feedback circuit, and the primary-side control circuit are the same as those described above, and details are not described herein again.

In some embodiments, an inductance value of a resonant inductor in the LC series resonant network is $L_r$, and a capacitance value of a resonant capacitor is $C_r$. The primary-side control circuit is further configured to calculate an oscillation frequency $f_r$ of the bridge circuit, where $$f_r = \frac{1}{2\pi\sqrt{(L_r + L_{lk1})C_r}}.$$

That the primary-side control circuit is configured to calculate the excitation inductance $L_{m.est}$ includes: The primary-side control circuit is configured to compare a working frequency $f_{sw}$ of the bridge circuit with the oscillation frequency $f_r$, and compare, when $f_{sw} < f_r$, in a collection phase $T_{cal}$ in one switching cycle T of the bridge circuit, an absolute value $|I_{m.est}|$ of the excitation current calculated by the feedback circuit in the current switching cycle T of the bridge circuit with an absolute value $|I_r|$ of the input current. When $|I_{m.est}| > |I_r|$, the excitation inductance $L_{m.est}$ received by the feedback circuit in the current switching cycle T of the bridge circuit is increased, to achieve $|I_{m.est}|=|I_r|$, and the excitation inductance $L_{m.est}$ is output to the feedback circuit. In addition, when $|I_{m.est}| < |I_r|$, the excitation inductance $L_{m.est}$ received by the feedback circuit in the current switching cycle T of the bridge circuit is decreased, to achieve $|I_{m.est}|=|I_r|$, and the excitation inductance $L_{m.est}$ is output to the feedback circuit. When $|I_{m.est}|=|I_r|$, the excitation inductance $L_{m.est}$ received by the feedback circuit in the current switching cycle T of the bridge circuit is output to the feedback circuit. $T_{cal}=T/2-T_f/2$, and $T_f=1/f_r$. A technical effect of a process of correcting the excitation inductance $L_{m.est}$ is the same as that described above, and details are not described herein again.

In some embodiments, that the primary-side control circuit is configured to calculate the excitation inductance $L_{m.est}$ includes: The primary-side control circuit is configured to output, when determining that the primary-side current $I_{pri.est}$ calculated by the feedback circuit is zero, the excitation inductance $L_{m.est}$ received by the feedback circuit in a current switching cycle T of the bridge circuit to the feedback circuit. A technical effect of a process of correcting the excitation inductance $L_{m.est}$ is the same as that described above, and details are not described herein again.

In some embodiments, the feedback circuit includes: a voltage operation circuit, a current operation circuit, and an output voltage-current operation circuit. The voltage operation circuit is electrically connected to the collection circuit and the primary-side control circuit, and is configured to calculate the excitation voltage $V_{m.est}$ based on the input voltage $V_t$, the input current $I_r$, and the leakage inductance $L_{lk1}$ of the primary-side winding provided by the primary-side control circuit. The current operation circuit is electrically connected to the voltage operation circuit and the primary-side control circuit, and is configured to calculate the excitation current $I_{m.est}$ and the primary-side current $I_{pri.est}$ based on the excitation voltage $V_{m.est}$ and the excitation inductance $L_{m.est}$ that is calculated by the primary-side control circuit. The output voltage-current operation circuit is electrically connected to the voltage operation circuit, the current operation circuit, and the primary-side control circuit, and is configured to calculate the output voltage $V_{o.est}$ and the output current $I_{o.est}$ of the resonant power supply based on the excitation voltage $V_{m.est}$ and the primary-side current $I_{pri.est}$. Technical effects of the voltage operation circuit, the current operation circuit, and the output voltage-current operation circuit are the same as those described above, and details are not described herein again.

In some embodiments, the voltage operation circuit includes a differentiator, a first operational amplifier, and a second operational amplifier. The differentiator is electrically connected to the collection circuit, and is configured to obtain a change rate of the input current $I_r$. The first operational amplifier is electrically connected to the differentiator and the primary-side control circuit, and is configured to multiply the change rate of the input current $I_r$ by the leakage inductance $L_{lk1}$ of the primary-side winding to obtain $L_{lk1}(dI_r/dt)$. The second operational amplifier is electrically connected to the first operational amplifier and the collection circuit, and is configured to calculate a difference between the input voltage $V_t$ and $L_{lk1}(dI_r/dt)$ output by the first operational amplifier, and use the difference as the excitation voltage $V_{m.est}$. The function of the voltage operation circuit may be implemented by hardware electronic components such as the differentiator, the first operational amplifier, and the second operational amplifier.

In some embodiments, the current operation circuit includes a third operational amplifier, an integrator, and a fourth operational amplifier. The third operational amplifier is electrically connected to the second operational amplifier and the primary-side control circuit, and is configured to obtain a product of a reciprocal of the excitation inductance $L_{m.est}$ calculated by the primary-side control circuit and the excitation voltage $V_{m.est}$. The integrator is electrically connected to the third operational amplifier, and is configured to perform integration on the excitation voltage $V_{m.est}$ to obtain the excitation current $I_{m.est}$. The fourth operational amplifier is electrically connected to the integrator and the collection circuit, and is configured to calculate a difference between the input current $I_r$ and the excitation current $I_{m.est}$ and use the difference as the primary-side current $I_{pri.est}$. In this way, the function of the current operation circuit may be implemented by hardware electronic components, such as the third operational amplifier, the integrator, and the fourth operational amplifier, included in the current operation circuit.

In some embodiments, the output voltage-current operation circuit includes: a fifth operational amplifier, a first low-pass filter, a sixth operational amplifier, a second low-pass filter, and an operational processing circuit. The fifth operational amplifier is electrically connected to the second operational amplifier and is configured to calculate an absolute value $|V_{m.est}|$ of the excitation voltage $V_{m.est}$. The first low-pass filter is electrically connected to the fifth operational amplifier, and is configured to calculate an average value $|V_{m.est}|_{avg}$ of the absolute value of the excitation voltage $V_{m.est}$. The sixth operational amplifier is electrically connected to the fourth operational amplifier, and is configured to calculate an absolute value $|I_{pri.est}|$ of the primary-side current $I_{pri.est}$. The second low-pass filter is electrically connected to the sixth operational amplifier, and is configured to calculate an average value $|I_{pri.est}|_{avg}$ of the absolute value of the primary-side current $I_{pri.est}$. The operational processing circuit is electrically connected to the fifth operational amplifier, the first low-pass filter, the sixth operational amplifier, and the second low-pass filter. When the primary-side control circuit determines that $f_{sw} = f_r$, the operational processing circuit is configured to calculate the output voltage $V_{o.est}$ and the output current $I_{o.est}$ of the resonant power supply based on an average value $|V_{m.est}|_{avg}$ of the absolute value of the excitation voltage $V_{m.est}$ in one switching cycle T of the bridge circuit, an average value $|I_{pri.est}|_{avg}$ of the absolute value of the primary-side current $I_{pri.est}$ in the switching cycle T of the bridge circuit, and a ratio K of turns of the primary-side winding to the secondary-side winding, where $$V_{o.est} = \frac{1}{K} \times |V_{mest}|_{avg}, \text{ and } I_{o.est} = \frac{1}{K} \times |I_{pri.est}|_{avg}.$$

When the primary-side control circuit determines that $f_{sw} < f_r$, the operational processing circuit is configured to obtain, in a half of one switching cycle T of the bridge circuit, a peak $|I_{pri.est}|_{max}$ of the absolute value of the primary-side current $I_{pri.est}$ from a plurality of absolute values $|I_{pri.est}|$ of the primary-side current $I_{pri.est}$ and an absolute value $|V_{m1}|$ of an excitation voltage matching the peak $|I_{pri.est}|_{max}$, and calculate the output voltage $V_{o.est}$ and the output current $I_{o.est}$ of the resonant power supply based on the average value $|I_{pri.est}|_{avg}$ of the absolute value of the primary-side current $I_{pri.est}$ and a ratio K of turns of the primary-side winding to the secondary-side winding of the transformer, where $$V_{o.est} = \frac{1}{K} \times |V_{m1}|, \text{ and } I_{o.est} = \frac{1}{K} \times |I_{pri.est}|_{avg}.$$

In this way, the function of the output voltage-current operation circuit may be implemented by hardware electronic components such as the fifth operational amplifier, the first low-pass filter, the sixth operational amplifier, the second low-pass filter, and the operational processing circuit. In addition, the oscillation frequency $f_r$ of the bridge circuit is compared with the working frequency $f_{sw}$ of the bridge circuit, and the output voltage $V_{o.est}$ and the output current $I_{o.est}$ of the resonant power supply are calculated in different manners based on different comparison results, so that errors of the calculated output voltage $V_{o.est}$ and the calculated output current $I_{o.est}$ can be reduced, and high-precision primary-side feedback can be implemented.

In some embodiments, a control method applied to any feedback excitation power supply controller described above is provided. The control method includes: calculating an excitation inductance $L_{m.est}$ and calculating an output voltage $V_{o.est}$ and an output current $I_{o.est}$ of the resonant power supply based on the input voltage $V_t$, the input current $I_r$, a leakage inductance $L_{lk1}$ of the primary-side winding, and the calculated excitation inductance $L_{m.est}$; and outputting the drive signal to the bridge circuit. The method for controlling the resonant power supply has a same technical effect as that of the resonant power supply provided in the foregoing embodiment, and details are not described herein again.

In some embodiments, the calculating an output voltage $V_{o.est}$ and an output current $I_{o.est}$ based on the input voltage $V_t$, the input current $I_r$, a leakage inductance $L_{lk1}$ of the primary-side winding, and the excitation inductance $L_{m.est}$ includes: collecting the input voltage $V_t$ and the input current $I_r$; next, calculating the excitation inductance $L_{m.est}$ and transmitting the leakage inductance $L_{lk1}$ of the primary-side winding and the calculated excitation inductance $L_{m.est}$ to a feedback circuit; next, calculating an excitation voltage $V_{m.est}$, an excitation current $I_{m.est}$, and a primary-side current $I_{pri.est}$ based on the input voltage $V_t$, the input current $I_r$, the leakage inductance $L_{lk1}$ of the primary-side winding, and the calculated excitation inductance $L_{m.est}$, where $$V_{m.est} = V_t - L_{lk1}\frac{dI_r}{dt};$$

$$I_{m.est} = \frac{1}{L_{m.est}} \int V_{m.est} dt; \text{ and}$$

$$I_{pri.est} = I_r - I_{m.est};$$

and next, calculating the output voltage $V_{o.est}$ and the output current $I_{o.est}$ of the resonant power supply based on the excitation voltage $V_{m.est}$ and the primary-side current $I_{pri.est}$ that are calculated. Since the excitation current $I_{m.est}$ and the primary-side current $I_{pri.est}$ are related to the calculated excitation inductance $L_{m.est}$, a value of an actual excitation inductance $L_m$ changes greatly with a change of an air gap distance, and therefore, differs from the calculated excitation inductance $L_{m.est}$. Therefore, the excitation inductance $L_{m.est}$ may be calculated by the foregoing primary-side control circuit based on a requirement, to correct the excitation inductance $L_{m.est}$ in real time, so that values of the primary-side current $I_{pri.est}$ and the excitation inductance $L_{m.est}$ that are calculated by the feedback circuit are more accurate, which is beneficial to improving the precision of the output voltage $V_{o.est}$ and the output current $I_{o.est}$ of the resonant power supply that are calculated and that are finally obtained.

In some embodiments, an inductance value of a resonant inductor in the LC series resonant network is $L_r$, and a capacitance value of a resonant capacitor is $C_r$. The control method further includes: calculating an oscillation frequency $f_r$ of the bridge circuit, where $$f_r = \frac{1}{2\pi\sqrt{(L_r + L_{lk1})C_r}}.$$

The calculating the excitation inductance $L_{m.est}$ includes: comparing a working frequency $f_{sw}$ of the bridge circuit with the oscillation frequency $f_r$, and comparing, when $f_{sw} < f_r$, in a collection phase $T_{cal}$ in one switching cycle T of the bridge circuit, an absolute value $|I_{m.est}|$ of the excitation current calculated by the feedback circuit in the current switching cycle T of the bridge circuit with an absolute value $|I_r|$ of the input current; increasing, when $|I_{m.est}| > |I_r|$, the excitation inductance $L_{m.est}$ received by the feedback circuit in the current switching cycle T of the bridge circuit, to achieve $|I_{m.est}| = |I_r|$, and outputting the increased excitation inductance $L_{m.est}$ to the feedback circuit; decreasing, when $|I_{m.est}| < |I_r|$, the excitation inductance $L_{m.est}$ received by the feedback circuit in the current switching cycle T of the bridge circuit, to achieve $|I_{m.est}| = |I_r|$, and outputting the decreased excitation inductance $L_{m.est}$ to the feedback circuit; and outputting, when $|I_{m.est}| = |I_r|$, the excitation inductance $L_{m.est}$ received by the feedback circuit in the current switching cycle T of the bridge circuit to the feedback circuit. $T_{cal} = T/2 - T_f/2$, and $T_f = 1/f_r$. A technical effect of a process of correcting the excitation inductance $L_{m.est}$ is the same as that described above, and details are not described herein again.

In some embodiments, the calculating an excitation inductance $L_{m.est}$ includes: outputting, when determining that the primary-side current $I_{pri.est}$ calculated by the feedback circuit is zero, the excitation inductance $L_{m.est}$ received by the feedback circuit in a current switching cycle T of the bridge circuit to the feedback circuit. A technical effect of obtaining a corrected value of the excitation inductance $L_{m.est}$ is the same as that described above, and details are not described herein again.

In some embodiments, when $f_{sw} \geq f_r$, the calculating the output voltage $V_{o.est}$ and the output current $I_{o.est}$ of the resonant power supply based on the excitation voltage $V_{m.est}$ and the primary-side current $I_{pri.est}$ that are calculated includes: calculating an average value $|V_{m.est}|_{avg}$ of the absolute value of the excitation voltage $V_{m.est}$ and an average value $|I_{pri.est}|_{avg}$ of the absolute value of the primary-side current $I_{pri.est}$ in a switching cycle T of the bridge circuit; calculating the output voltage $V_{o.est}$ and the output current $I_{o.est}$ of the resonant power supply based on the average value $|V_{m.est}|_{avg}$ of the absolute value of the excitation voltage $V_{m.est}$, the average value $|I_{pri.est}|_{avg}$ of the absolute value of the primary-side current $I_{pri.est}$, and a ratio K of turns of the primary-side winding to the secondary-side winding of the transformer, where $$V_{o.est} = \frac{1}{K} \times |V_{mest}|_{avg}, \text{ and } I_{o.est} = \frac{1}{K} \times |I_{pri.est}|_{avg}.$$

When $f_{sw} \geq f_r$, a technical effect of calculating the output voltage $V_{o.est}$ and the output current $I_{o.est}$ separately using the average value $|V_m|_{avg}$ of the excitation voltage $V_{m.est}$ and the average value $|I_{pri.est}|_{avg}$ of the primary-side current $I_{pri.est}$ is the same as that described above, and details are not described herein again.

In some embodiments, when $f_{sw} < f_r$, the calculating the output voltage $V_{o.est}$ and the output current $I_{o.est}$ of the resonant power supply based on the excitation voltage $V_{m.est}$ and the primary-side current $I_{pri.est}$ that are calculated includes: calculating an average value $|I_{pri.est}|_{avg}$ of the absolute value of the primary-side current $I_{pri.est}$ in a switching cycle T of the bridge circuit, and obtaining a plurality of absolute values $|V_{m.est}|$ of the excitation voltage $V_{m.est}$ and a plurality of absolute values $|I_{pri.est}|$ of the primary-side current $I_{pri.est}$ consecutively in a half of the switching cycle T; obtaining a peak $|I_{pri.est}|$ max of the absolute value of the primary-side current $I_{pri.est}$ from the plurality of absolute values $|I_{pri.est}|$ of the primary-side current $I_{pri.est}$ and an absolute value $|V_{m1}|$ of an excitation voltage matching the peak $|I_{pri.est}|_{max}$; and calculating the output voltage $V_{o.est}$ and the output current $I_{o.est}$ based on the peak $|I_{pri.est}|_{max}$ of the absolute value of the primary-side current $I_{pri.est}$, the absolute value $|V_{m1}|$ of the excitation voltage matching the peak $|I_{pri.est}|_{max}$, the average value $|I_{pri}|_{avg}$ of the absolute value of the primary-side current $I_{pri}$, and a ratio K of turns of the primary-side winding to the secondary-side winding, where $$V_{o.est} = \frac{1}{K} \times |V_{m1}|, \text{ and } I_{o.est} = \frac{1}{K} \times |I_{pri.est}|_{avg}.$$

When $f_{sw} < f_r$, a technical effect of calculating the output voltage $V_{o.est}$ and the output current $I_{o.est}$ separately using the absolute value $|V_{m1}|$ of the excitation voltage matching the peak $|I_{pri.est}|_{max}$ and the average value $|I_{pri}|_{avg}$ of the absolute value of the primary-side current $I_{pri.est}$ is the same as that described above, and details are not described herein again.

In some embodiments, a control apparatus is provided, including a load and any resonant power supply described above. The resonant power supply is electrically connected to the load. The control apparatus has a same technical effect as that of the resonant power supply provided in the foregoing embodiment, and details are not described herein again.

In some embodiments, the load includes an electrically excitation winding. The control apparatus further includes a rotating shaft and an armature winding. The rotating shaft is connected to the excitation winding. The armature winding is electrically connected to the excitation winding and a primary-side feedback excitation power supply controller in the resonant power supply, and is configured to generate a rotating magnetic field that drives the rotating shaft to rotate, where the armature winding is further configured to control, based on the output voltage $V_{o.est}$ and the output current $I_{o.est}$ of the resonant power supply that are calculated by the primary-side feedback excitation power supply controller, and an output voltage and an output current of the resonant power supply that are preset in the primary-side feedback excitation power supply controller, the primary-side feedback excitation power supply controller to output the drive signal. In this way, the primary-side feedback excitation power supply controller in the resonant power supply is electrically connected to the primary-side winding of the transformer, and does not rotate with rotation of the rotating shaft in the brushless excitation synchronous motor, so that the calculation precision can be improved while simplifying the structure of the secondary-side circuit that rotates with the rotating shaft in the transformer and reducing the probability of a failure of a device that rotates with the rotating shaft at a high speed.

In some embodiments, a computer-readable storage medium is provided, including computer instructions. When the computer instructions are run on a primary-side feedback excitation power supply controller, the primary-side feedback excitation power supply controller is enabled to perform any control method described above. The computer-readable storage medium has a same technical effect as that of the primary-side feedback excitation power supply controller provided in the foregoing embodiment, and details are not described herein again.

According to another aspect of this application, a computer program product is provided, including computer instructions. When the computer instructions are run on a primary-side feedback excitation power supply controller in a control apparatus, the primary-side feedback excitation power supply controller is enabled to perform any control method described above. The computer program product has a same technical effect as that of the primary-side feedback excitation power supply controller provided in the foregoing embodiment, and details are not described herein again.

REFERENCE NUMERALS

01—control apparatus; 100—power supply; 10—resonant power supply; 11—transformer; 110—primary-side winding; 111—secondary-side winding; 20—load; 30—rectifier; 120—bridge circuit; 121—LC series resonant network; 40—primary-side feedback excitation power supply controller; 21—armature winding; 22—electric drive controller; 401—collection circuit; 402—feedback circuit; 403—primary-side control circuit; 412—voltage operation circuit; 422—current operation circuit; 432—output voltage-current operation circuit; 51—differentiator; 61—first operational amplifier; 62—second operational amplifier; 63—third operational amplifier; 64—fourth operational amplifier; 52—integrator; 65—fifth operational amplifier; 71—first low-pass filter; 66—sixth operational amplifier; 72—second low-pass filter; 70—operational processing circuit; 200—digital signal processor.

DESCRIPTION OF EMBODIMENTS

The following describes the technical solutions in embodiments of this application with reference to the accompanying drawings in embodiments of this application. It is clear that the described embodiments are merely some rather than all of embodiments of this application.

Terms such as "first" and "second" mentioned below are merely intended for a purpose of description, and shall not be understood as an indication or implication of relative importance or implicit indication of a quantity of indicated technical features. Therefore, a feature defined by "first" or "second" may explicitly or implicitly include one or more features.

In this application, unless otherwise specified and limited, the term "connection" should be understood in a broad sense. For example, the "connection" may be a fixed connection, a detachable connection, an integration, a direct connection, or an indirect connection through an intermediate medium. In addition, the term "electrical connection" may be a direct electrical connection, or may be an indirect electrical connection through an intermediate medium.

Figure 1A:
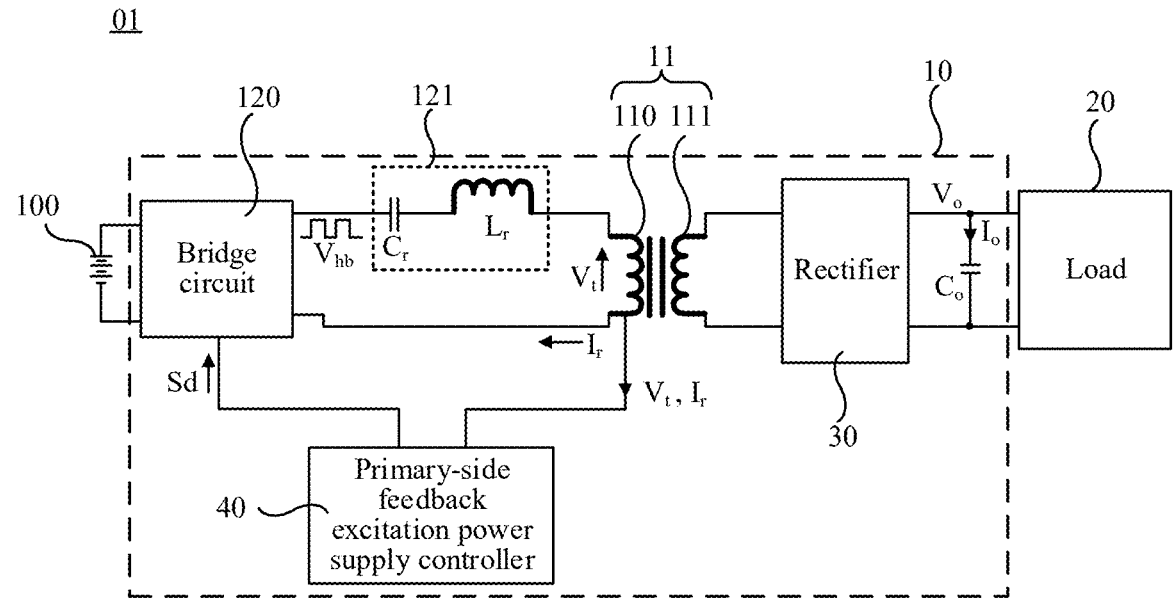
FIG. 1A is a schematic diagram of a structure of another control apparatus according to an embodiment of this application.

An embodiment of this application provides a control apparatus 01. As shown in FIG. 1A, the control apparatus 01 may include a resonant power supply 10 and a load 20. The resonant power supply 10 is configured to supply power to the load 20, to drive the load 20 to work. The resonant power supply 10 may include a transformer 11, a bridge circuit 120, an LC series resonant network 121, a rectifier 30, an output capacitor Co, and a primary-side feedback excitation power supply controller 40. The transformer 11 includes a primary-side winding 110 and a secondary-side winding 111.

The bridge circuit 120 is electrically connected to a power supply 100. The bridge circuit 120 is configured to convert, based on a drive signal Sd output by the primary-side feedback excitation power supply controller 40, a direct current provided by a power supply 100 into a square wave signal $V_{hb}$ shown in FIG. 1B. The LC series resonant network 121 is electrically connected to the bridge circuit 120 and the primary-side winding 110. In some embodiments of this application, the bridge circuit 120 may be a full-bridge circuit or a half-bridge circuit. The bridge circuit 120 includes a plurality of metal oxide semiconductor (MOS) transistors. The LC series resonant network 121 may include a resonant inductor $L_r$ and a resonant capacitor $C_r$ that are connected in series.

Figure 1B:
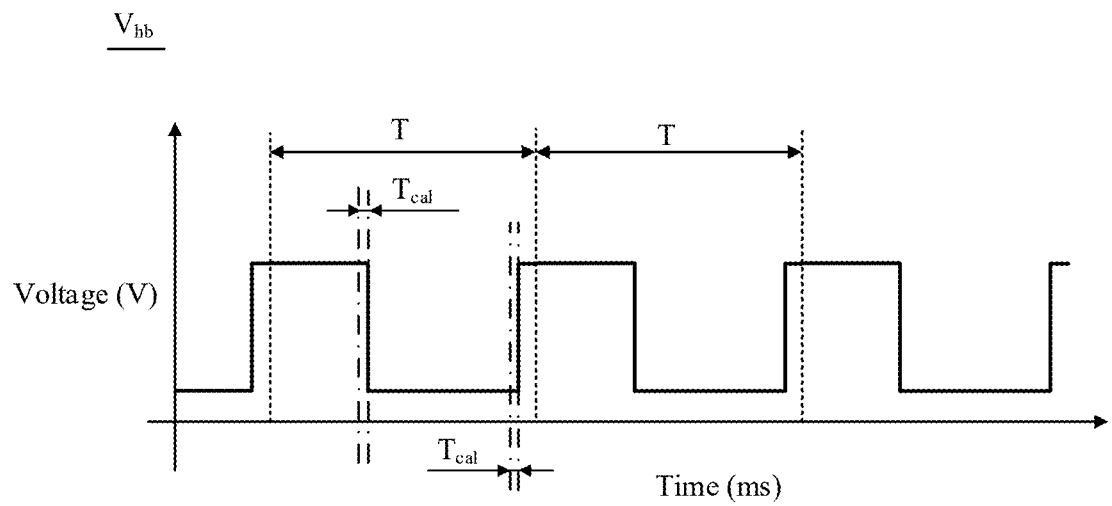
FIG. 1B is a schematic diagram of a square wave signal output by a bridge circuit according to an embodiment of this application.

In this case, the bridge circuit 120 receives the drive signal Sd output by the primary-side feedback excitation power supply controller 40, and can control on duration and off duration of a MOS transistor in the bridge circuit 120 (that is, a switching frequency of the MOS transistor, hereinafter referred to as a working frequency $f_{sw}$ of the bridge circuit 120), to enable the bridge circuit 120 to convert the direct current of the power supply 100 into the square wave signal $V_{hb}$. Therefore, the frequency and duty ratio of the square wave signal $V_{hb}$ can be controlled based on the drive signal Sd. As shown in FIG. 1B, the square wave signal $V_{hb}$ has a plurality of switching cycles T, and the switching cycle T and the switching frequency $f_{sw}$ of the MOS transistor in the bridge circuit 120 satisfy: $f_{sw}=1/T$.

In addition, the square wave signal $V_{hb}$ may control charging and discharging processes of the inductor $L_r$ and the resonant capacitor $C_r$ in the LC series resonant network 121. In the charging and discharging processes of the inductor $L_r$ and the resonant capacitor $C_r$, the LC series resonant network 121 can convert the square wave signal $V_{hb}$ into an alternating current, and output the alternating current to the primary-side winding 110. The alternating current output by the LC series resonant network 121 may include an input voltage $V_t$ and an input current $I_r$. A waveform of the alternating current may be approximately a sine wave.

Based on this, as shown in FIG. 1A, the input voltage $V_t$ in the alternating current output by the LC series resonant network 121 is applied to the primary-side winding 110 of the transformer 11, and when the input current $I_r$ flows through the primary-side winding 110, a changing magnetic field is generated on the primary-side winding 110. The secondary-side winding 111 induces an alternating current in the magnetic field.

In addition, the rectifier 30 in the resonant power supply 10 is electrically connected between the secondary-side winding 111 and the load 20. One end of the output capacitor Co is electrically connected to the rectifier 30 and the load 20, and another end is grounded. The rectifier 30 can convert the alternating current output by the secondary-side winding 111 into a direct current, and stably transmit the direct current to the load 20 through the output capacitor Co, to supply power to the load 20. The direct current output by the rectifier bridge 30 includes an actual output voltage $V_o$ and an actual output current $I_o$ of the resonant power supply 10.

The transformer 11 shown in FIG. 1A is a structure of an ideal transformer model. However, in an actual working process of the transformer 11, not all magnetic field lines in the magnetic field generated by the primary-side winding 110 pass through the secondary-side winding 111, resulting in magnetic leakage. In this way, an inductance that generates magnetic leakage and that exists in the transformer 11 is referred to as a leakage inductance. In addition, the primary-side winding 110 has an initial inductance, which may be referred to as an excitation inductance $L_m$.

Figure 2:
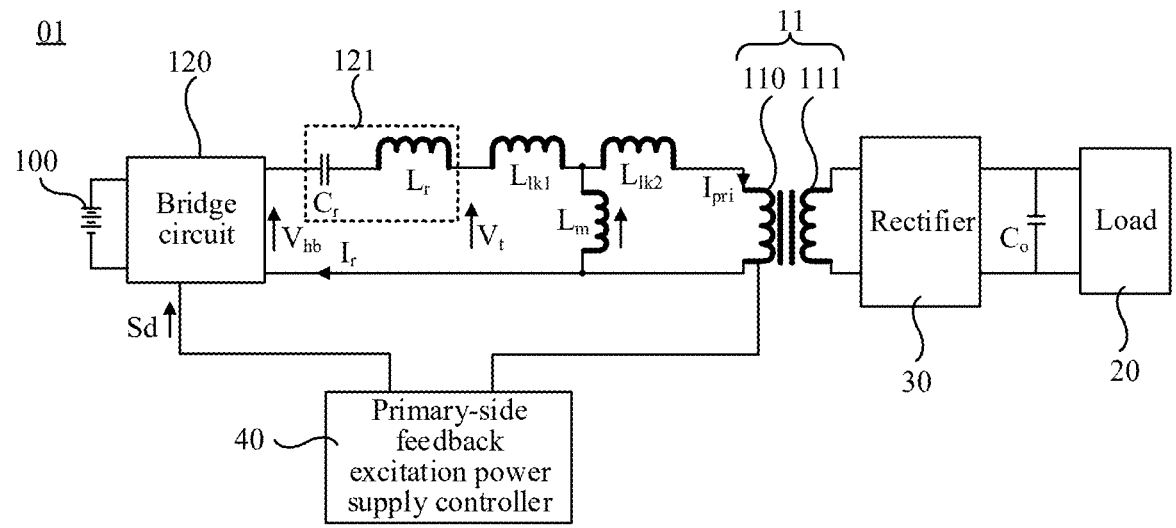
FIG. 2 is a schematic diagram of a structure of another control apparatus according to an embodiment of this application.

In this case, a structure of an a non-idealansformer model of the transformer 11 is shown in FIG. 2. It can be seen that the transformer 11 further includes a leakage inductance $L_{lk1}$ of the primary-side winding 110, a leakage inductance $L_{lk2}$ fed back from the secondary-side winding 111 to the primary side, and an excitation inductance $L_m$. The resonant inductor $L_r$ is connected in series to the leakage inductance $L_{lk1}$ of the primary-side winding 110, and the excitation inductance $L_m$ is connected in parallel to the leakage inductance $L_{lk2}$ fed back from the secondary-side winding 111 to the primary side, and then is connected in series to the leakage inductance $L_{lk1}$ of the primary-side winding 110.

It should be noted that the leakage inductance $L_{lk2}$ fed back from the secondary-side winding 111 to the primary side means that when a quantity of turns of the primary-side winding 110 is $N_p$ and a quantity of turns of the secondary-side winding 111 is $N_s$, the leakage inductance $L_{lk2}$ fed back from the secondary-side winding 111 to the primary side may be calculated based on a leakage inductance $L_{lk2}'$ of the secondary-side winding 111. $L_{lk2}=L_{lk2}'\times(N_p/N_s)^2$.

Figure 3:
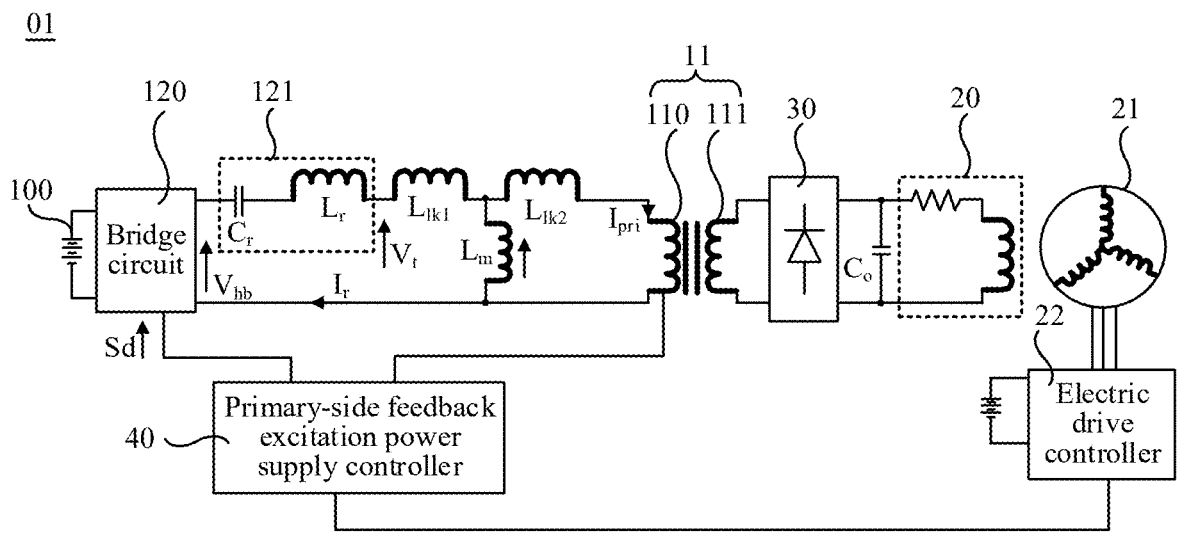
FIG. 3 is a schematic diagram of a structure of another control apparatus according to an embodiment of this application.

In some embodiments of this application, the control apparatus 01 may be a brushless excitation synchronous motor. In this case, as shown in FIG. 3, an excitation winding of the brushless excitation synchronous motor may serve as the load 20 as shown in FIG. 2. In addition, the brushless excitation synchronous motor may further include an armature winding 21, an electric drive controller 22, and a rotating shaft (not shown in the figure).

The excitation winding of the load 20 may be arranged on the rotating shaft, and a constant magnetic field is generated when the resonant power supply 10 supplies power to the excitation winding. The electric drive controller 22 is electrically connected to the armature winding 21, and the electric drive controller 22 can supply power to the armature winding 21, and control the armature winding 21 to generate a rotating magnetic field that drives the rotating shaft to rotate. When the rotating shaft rotates, the excitation winding (that is, the load 20) connected to the rotating shaft, the rectifier 30, and the secondary-side winding 111 of the transformer 11 that serve as rotating parts of the control apparatus 01 rotate with the rotating shaft.

It should be noted that the electric drive controller 22 may be powered by a separate power supply, or may share the power supply 100 to which the bridge circuit 120 is electrically connected.

As shown in FIG. 3, the primary-side feedback excitation power supply controller 40 may be electrically connected to the primary-side winding 110, the bridge circuit 120, and the LC series resonant network 121 to control output characteristics, such as a rotation speed and output power, of the brushless excitation synchronous motor. The primary-side feedback excitation power supply controller 40 may be configured to receive the input voltage $V_t$ and the input current $I_r$, and output the drive signal Sd to the bridge circuit 120. The drive signal is for driving the bridge circuit 120 to convert a direct current provided by a power supply 100 into a square wave signal $V_{hb}$. In this way, the primary-side feedback excitation power supply controller can perform closed-loop control on the bridge circuit 120, and adjust the frequency and duty cycle of an output signal of the bridge circuit 120 to matching target values. In this way, the output voltage and the output current of the resonant power supply 10 can match target values. In addition, the primary-side feedback excitation power supply controller 40 is electrically connected to the primary-side winding 110, to simplify a structure of the secondary-side circuit in the transformer. In some embodiments, the primary-side feedback excitation power supply controller 40 may be configured to calculate an excitation inductance $L_{m.est}$, calculate an output voltage $V_{o.est}$ and an output current $I_{o.est}$ of the resonant power supply 10 based on the input voltage $V_t$, the input current $I_r$, a leakage inductance $L_{lk1}$ of the primary-side winding, and the calculated excitation inductance $L_{m.est}$, and output the drive signal Sd to the bridge circuit 120.

It should be noted that in this embodiment of this application, a subscript of a parameter calculated by the primary-side feedback excitation power supply controller 40 is identified using "est".

In addition, the electric drive controller 22 may further be electrically connected to the primary-side feedback excitation power supply controller 40. The electric drive controller 22 is configured to provide a control signal to the primary-side feedback excitation power supply controller 40 based on preset values of an output voltage and an output current that are preset in the primary-side feedback excitation power supply controller 40 and the output voltage $V_{o.est}$ and the output current $I_{o.est}$ of the resonant power supply 10 calculated by the primary-side feedback excitation power supply controller 40, to control the drive signal Sd output by the primary-side feedback excitation power supply controller 40. Finally, the voltage on the excitation winding serving as the load 20 is the same as or approximately the same as the preset value of the output voltage, and the current on the excitation winding is the same as or approximately the preset value of the output current.

The foregoing descriptions are provided by using an example in which the control apparatus 01 is a brushless excitation synchronous motor, and an excitation winding in the brushless excitation synchronous motor is the load 20. In some other embodiments of this application, the control apparatus 01 may be an in-vehicle charging device, and the load 20 in the control apparatus 01 may be an in-vehicle rechargeable battery. Alternatively, the control apparatus 01 may be a server power supply device, and the load 20 in the control apparatus 01 may be a server. Alternatively, the control apparatus 01 may be a mechanical rotating arm power supply device, and the load 20 in the control apparatus 01 may be a mechanical rotating arm. Alternatively, the control apparatus 01 may be a light emitting diode (LED) power supply device, and the load 20 in the control apparatus 01 may be an LED. For ease of description, descriptions are provided below all by using an example in which the control apparatus 01 is a brushless excitation synchronous motor, and an excitation winding in the brushless excitation synchronous motor is the load 20.

Figure 4:
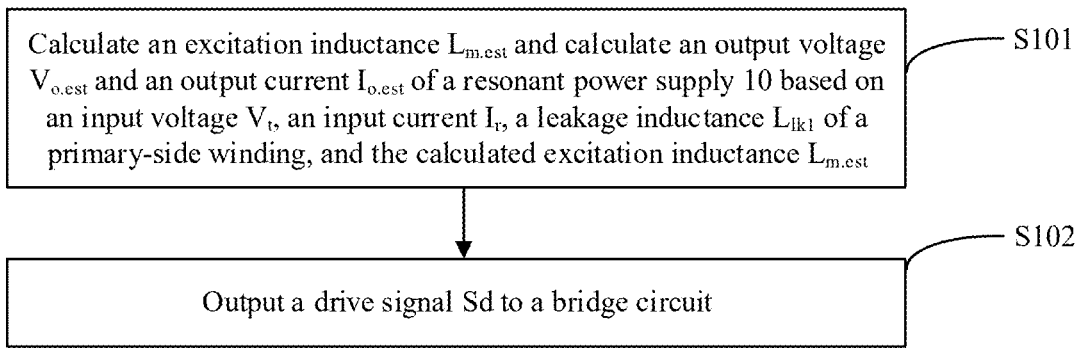
FIG. 4 is a flowchart of a control method of a control apparatus according to an embodiment of this application.

The following describes a structure of the primary-side feedback excitation power supply controller 40 with reference to the foregoing control method of the primary-side feedback excitation power supply controller 40. In this embodiment of this application, the foregoing control method of the primary-side feedback excitation power supply controller 40 includes S101 and S102 shown in FIG. 4.

S101. Calculate an excitation inductance $L_{m.est}$ and calculate an output voltage $V_{o.est}$ and an output current $I_{o.est}$ of the resonant power supply 10 based on the input voltage $V_r$, the input current $I_r$, a leakage inductance $L_{lk1}$ of the primary-side winding, and the calculated excitation inductance $L_{m.est}$.

Figure 5:
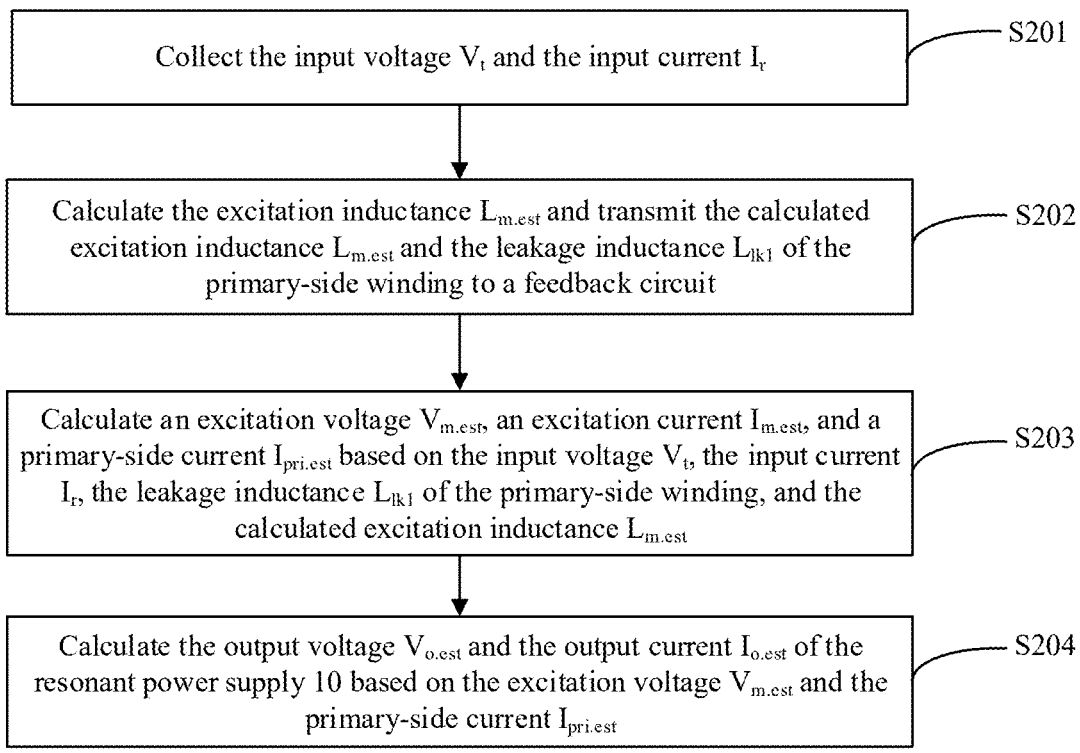
FIG. 5 is a flowchart of operations of S101 in FIG. 4.

In some embodiments of this application, S101 may include S201 to S204 shown in FIG. 5.

S201. Collect the input voltage $V_t$ and the input current $I_r$.

Figure 6:
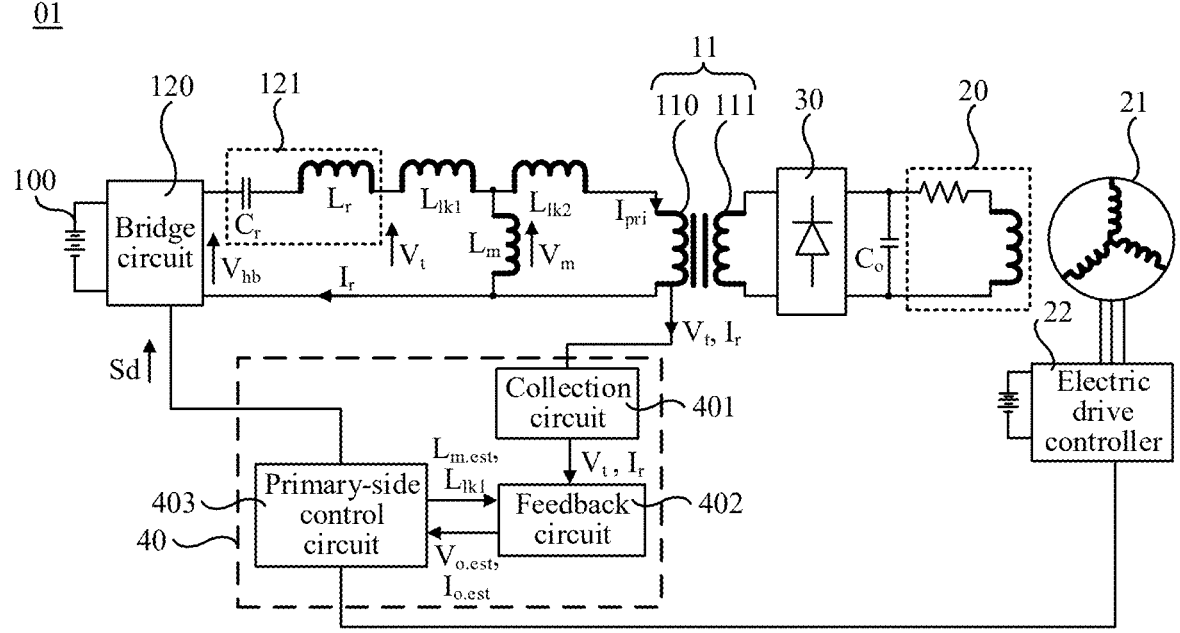
FIG. 6 is a schematic diagram of a structure of another control apparatus according to an embodiment of this application.

The primary-side feedback excitation power supply controller 40 may include a collection circuit 401 shown in FIG. 6. The collection circuit 401 is electrically connected to the primary-side winding 110. The collection circuit 401 is configured to perform S201, to collect the input voltage $V_t$ and the input current $I_r$.

S203. Calculate an excitation voltage $V_{m.est}$, an excitation current $I_{m.est}$, and a primary-side current $I_{pri.est}$ based on the input voltage $V_r$, the input current $I_r$, the leakage inductance $L_{lk1}$ of the primary-side winding, and the calculated excitation inductance $L_{m.est}$.

The primary-side feedback excitation power supply controller 40 may include a feedback circuit 402 and a primary-side control circuit 403 shown in FIG. 6. The feedback circuit 402 may be electrically connected to the collection circuit 401 and the primary-side control circuit 403. The feedback circuit 402 is configured to receive the input voltage $V_t$ and the input current $I_r$ that are collected by the collection circuit 401, and receive the leakage inductance $L_{lk1}$ of the primary-side winding 110 and the calculated excitation inductance $L_{m.est}$ that are provided by the primary-side control circuit 403, to perform S203.

It should be noted that an estimated value of the leakage inductance $L_{lk1}$ of the primary-side winding 110 may be stored in the primary-side control circuit 403 in advance.

Figure 7:
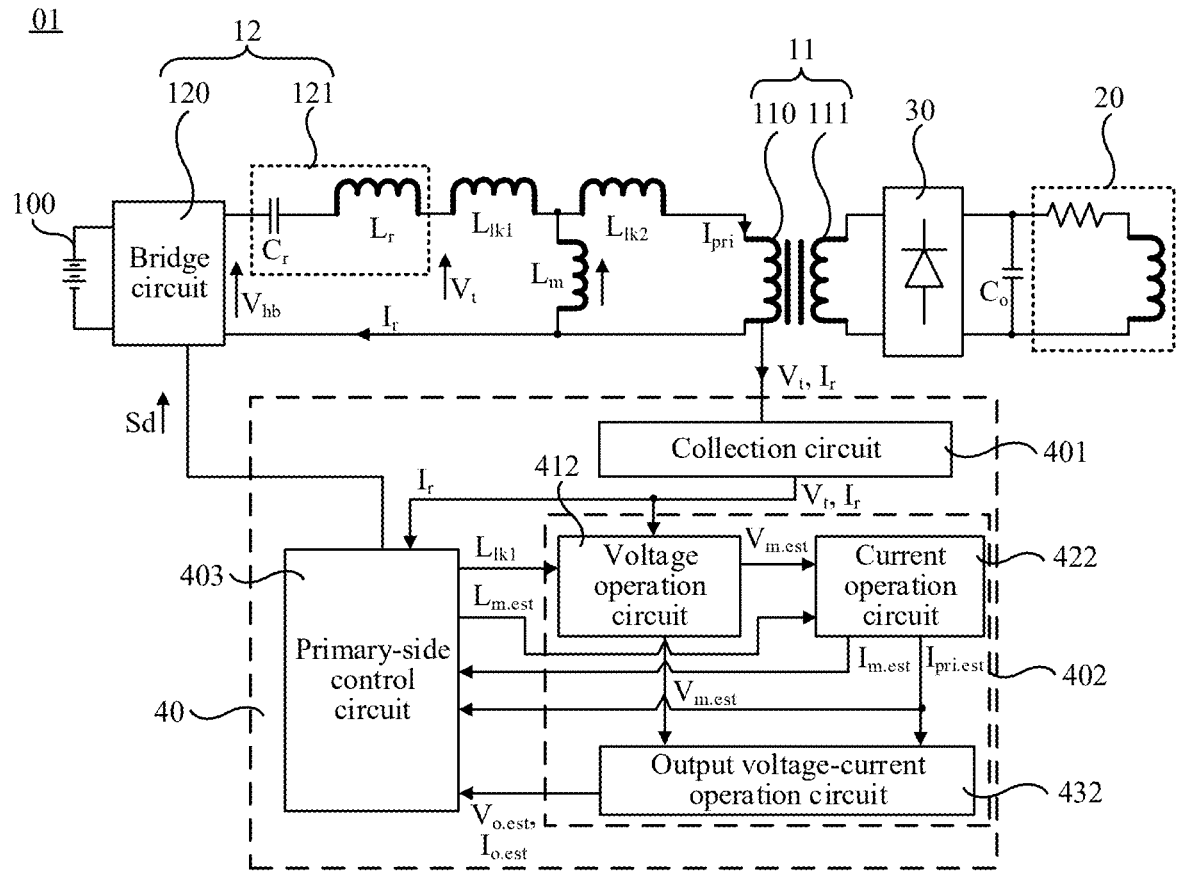
FIG. 7 is a schematic diagram of a structure of another control apparatus according to an embodiment of this application.

To enable the feedback circuit 402 to perform S203, in some embodiments of this application, the feedback circuit 402 may include a voltage operation circuit 412 and a current operation circuit 422 shown in FIG. 7. The voltage operation circuit 412 may be electrically connected to the collection circuit 401 and the primary-side control circuit 403. The voltage operation circuit 412 is configured to receive the input voltage $V_t$ and the input current $I_r$ that are collected by the collection circuit 401, and the leakage inductance $L_{lk1}$ of the primary-side winding 110 provided by the primary-side control circuit 403. Then, the excitation voltage $V_{m.est}$ is calculated based on the input voltage $V_r$, the input current $I_r$, and the leakage inductance $L_{lk1}$ of the primary-side winding. The calculated excitation voltage $V_{m.est}$ can satisfy the following formula (1):

$$V_{m.est} = V_t - L_{lk1}\frac{dI_r}{dt}. \tag{1}$$

Figure 8:
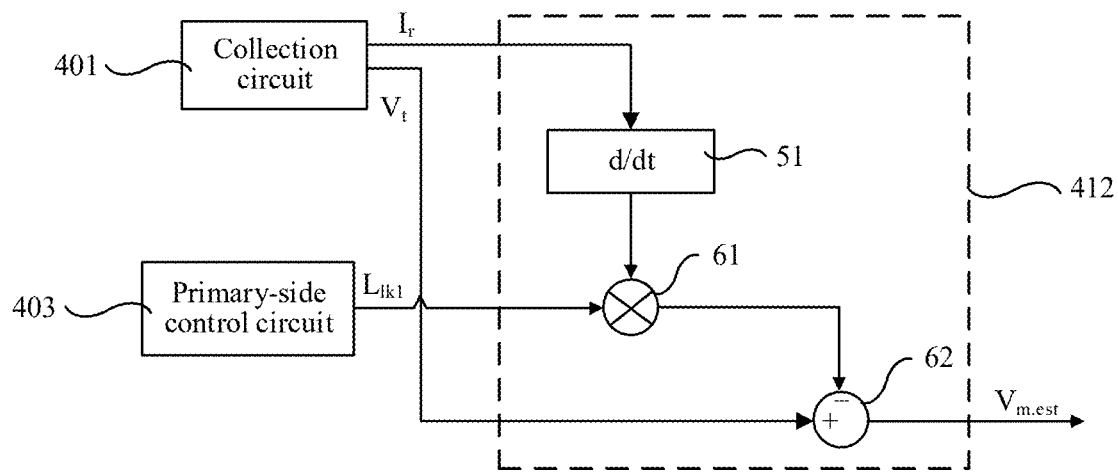
FIG. 8 is a schematic diagram of a structure of a voltage operation circuit in FIG. 7.

Based on this, in some embodiments of this application, a hardware structure that constitutes the voltage operation circuit 412 may be shown in FIG. 8. The voltage operation circuit 412 may include: a differentiator 51, a first operational amplifier 61, and a second operational amplifier 62. The differentiator 51 is electrically connected to the collection circuit 401. The differentiator 51 is configured to receive $I_r$ collected by the collection circuit 401, and obtain a change rate $dI_r/dt$ of the input current $I_r$.

The first operational amplifier 61 is electrically connected to the differentiator 51 and the primary-side control circuit 403. The first operational amplifier 61 is configured to multiply the change rate $dI_r/dt$ of the input current $I_r$ by the leakage inductance $L_{lk1}$ of the primary-side winding 110, to obtain $L_{lk1} \times (dI_r/dt)$. The second operational amplifier 62 is electrically connected to the first operational amplifier 61 and the collection circuit 401. The second operational amplifier 62 is configured to calculate a difference between the input voltage $V_t$ provided by the collection circuit 401 and $L_{lk1}(dI_r/dt)$ output by the first operational amplifier 61, and use the difference as the excitation voltage $V_{m.est}$, to obtain the foregoing formula (1). A value of the leakage inductance $L_{lk1}$ of the primary-side winding 110 may be used as an operational amplifier gain of the first operational amplifier 61.

It should be noted that FIG. 8 is illustrated by using an example in which the change rate $dI_r/dt$ of the input current $I_r$ is first calculated by the differentiator 51, and then $L_{lk1}(dI_r/dt)$ is obtained by the first operational amplifier 61.

In this case, the first operational amplifier 61 is located between the differentiator 51 and the second operational amplifier 62. Alternatively, in some other embodiments of this application, $L_{lk1} \times I_r$ may be first obtained by the first operational amplifier 61, and then, $L_{lk1}(dI_r/dt)$ may be obtained by the differentiator 51. In this case, the differentiator 51 is electrically connected between the first operational amplifier 61 and the second operational amplifier 62.

In addition, in FIG. 7, the current operation circuit 422 in the feedback circuit 402 may be electrically connected to the voltage operation circuit 412 and the primary-side control circuit 403. The current operation circuit 422 is configured to calculate the excitation current $I_{m.est}$ and the primary-side current $I_{pri.est}$ based on the excitation voltage $V_{m.est}$ calculated by the voltage operation circuit 412 and the excitation inductance $L_{m.est}$ calculated by the primary-side control circuit 403. The calculated excitation current $I_{m.est}$ satisfies the following formula (2), and the calculated primary-side current $I_{pri.est}$ satisfies the following formula (3):

$$I_{m.est} = \frac{1}{L_{m.est}} \int V_{m.est} dt; \text{ and} \qquad (2)$$

$$I_{pri.est} = I_r - I_{m.est}. \qquad (3)$$

Figure 9:
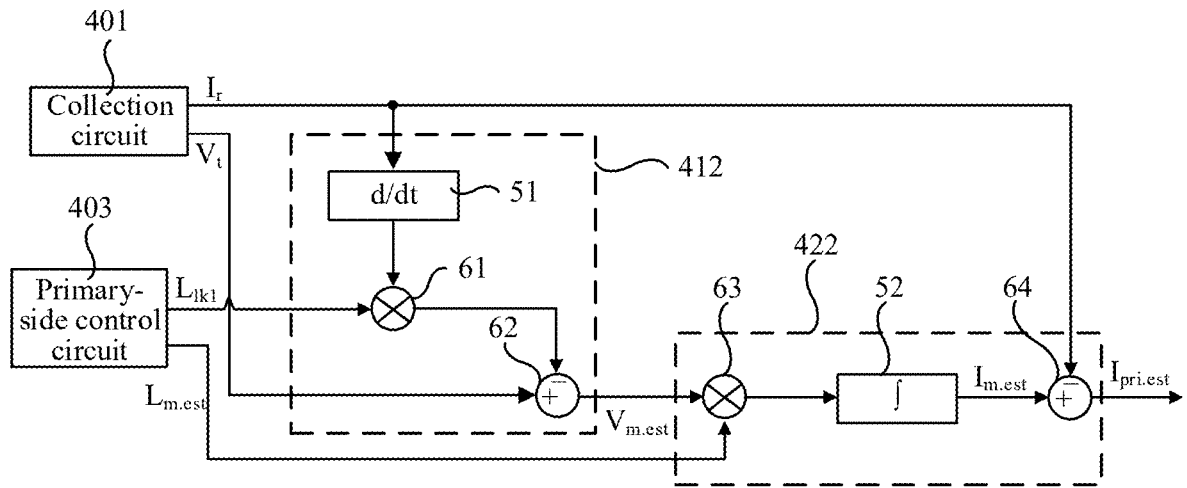
FIG. 9 is a schematic diagram of a structure of a voltage operation circuit and a current operation circuit in FIG. 7.

Based on this, in some embodiments of this application, a hardware structure that constitutes the foregoing current operation circuit 422 may be shown in FIG. 9. The current operation circuit 422 may include a third operational amplifier 63, an integrator 52, and a fourth operational amplifier 64. The third operational amplifier 63 may be electrically connected to the second operational amplifier 62 and the primary-side control circuit 403. The third operational amplifier 63 is configured to obtain a product of a reciprocal ($1/L_{m.est}$) of the excitation inductance $L_{m.est}$ output by the primary-side control circuit 403 and the excitation voltage $V_{m.est}$, that is, obtain $V_{m.est} \times (1/L_{m.est})$. A value of the excitation inductance $L_{m.est}$ output by the primary-side control circuit 403 may be used as an operational amplifier gain of the third operational amplifier 63.

The integrator 52 is electrically connected to the third operational amplifier 63. The integrator 52 is configured to perform integration on the excitation voltage $V_{m.est}$ to obtain the excitation current $I_{m.est}$, to obtain the foregoing formula (2). Further, the fourth operational amplifier 64 is electrically connected to the integrator 52 and the collection circuit 402. The fourth operational amplifier 64 is configured to calculate a difference between the input current $I_r$ output by the collection circuit 402 and the excitation current $I_{m.est}$ output by the integrator 52, and use the difference as the primary-side current $I_{pri.est}$, to obtain the foregoing formula (3).

It should be noted that in FIG. 9, the excitation current $I_{m.est}$ is obtained by first calculating $V_{m.est} \times (1/L_{m.est})$ by the third operational amplifier 63 and then performing integration on the excitation voltage $V_{m.est}$ by the integrator 52. In this case, the integrator 52 is located between the third operational amplifier 63 and the fourth operational amplifier 64. Alternatively, in some other embodiments of this application, integration may be first performed on the excitation voltage $V_{m.est}$ by the integrator 52. Then, a product of an integration result of the integrator 52 and a reciprocal ($1/L_{m.est}$) of the excitation inductance $L_{m.est}$ is calculated by the third operational amplifier 63, to obtain the excitation current $I_{m.est}$. In this case, the third operational amplifier 63 may be located between the integrator 52 and the fourth operational amplifier 64.

It can be known from the foregoing formula (1) that the excitation voltage $V_{m.est}$ is related to the leakage inductance $L_{lk1}$ of the primary-side winding 110. It can be known from formula (2) and formula (3) that the excitation current $I_{m.est}$ is related to the excitation inductance $L_{m.est}$. Moreover, the primary-side current $I_{pri.est}$ can be obtained based on the excitation current $I_{m.est}$. Therefore, the primary-side current $I_{pri.est}$ is related to the excitation inductance $L_{m.est}$.

Based on this, the transformer 11 has different air gap distances between an ideal axis position and an actual axis position of the secondary-side winding 111 of the transformer 11 under different installation tolerances or during transportation or use. For example, as shown in Table 1, a radial deviation of the secondary-side winding 111, the leakage inductance $L_{lk1}$ of the primary-side winding 110, and an actual excitation inductance $L_m$ changes with a change of an air gap distance.

TABLE 1

| Air gap distance (mm) | Radial deviation (mm) | Leakage inductance $L_{lk1}$ (µH) of primary-side winding 110 | Excitation inductance $L_m$ (µH) |
| --- | --- | --- | --- |
| 0.6 | 0 | 6.01 | 117.2 |
|  | 0.32 | 6.01 | 133.0 |
| 0.8 | 0 | 6.08 | 93.5 |
|  | 0.32 | 6.08 | 99.8 |
| 1.0 | 0 | 6.15 | 78.5 |
|  | 0.32 | 6.15 | 81.6 |

It can be learned from Table 1 that, when the air gap distance differs, a value of the leakage inductance $L_{lk1}$ of the primary-side winding 110 does not change greatly, but a change in a value of the actual excitation inductance $L_m$ is greatly affected by the air gap distance. Therefore, when the air gap distance changes, since the excitation voltage $V_{m.est}$ calculated by the voltage operation circuit 412 is related to the leakage inductance $L_{lk1}$ of the primary-side winding 110, a value of the excitation voltage $V_{m.est}$ does not change greatly with the change in the air gap distance. Therefore, the value of the excitation voltage $V_{m.est}$ calculated by the voltage operation circuit 412 is accurate.

Figure 10:
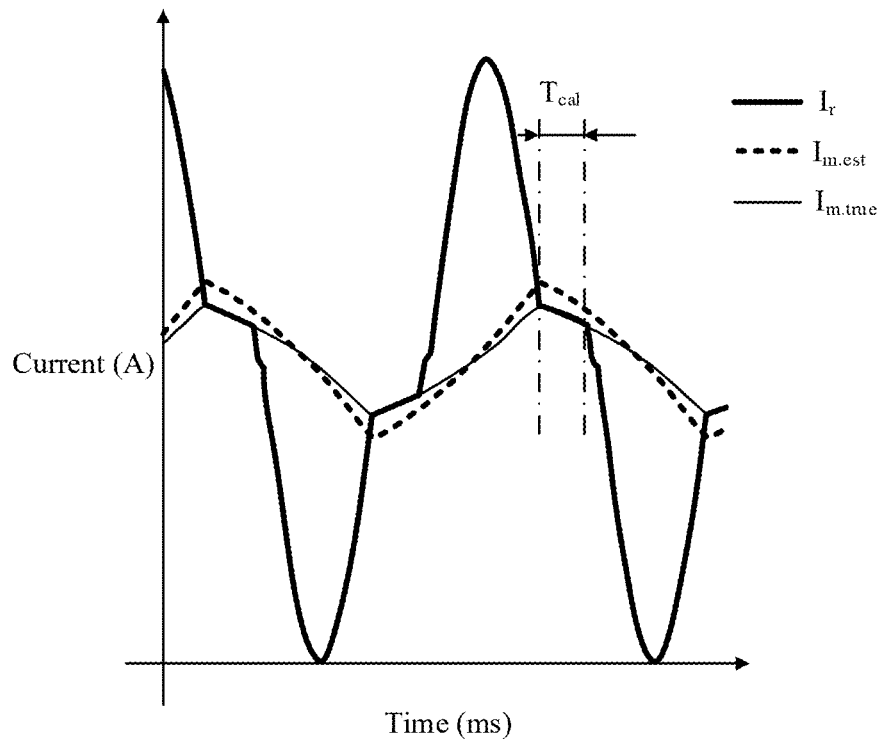
FIG. 10 is a waveform diagram of an input current, a calculated excitation current, and an actual excitation current according to an embodiment of this application.

However, since the excitation current $I_{m.est}$ and the primary-side current $I_{pri.est}$ are related to the calculated excitation inductance $L_{m.est}$ because the value of the actual excitation inductance $L_m$ changes greatly with the change in the air gap distance, the calculated excitation current $I_{m.est}$ deviates from a value of an actual excitation current $I_{m.true}$. As shown in FIG. 10, there is a deviation between a waveform of the excitation current $I_{m.est}$ calculated according to formula (2) by using foregoing current operation circuit 422 and a waveform of the actual excitation current $I_{m.true}$. Therefore, before the current operation circuit 422 calculates the excitation current $I_{m.est}$ and the primary-side current $I_{pri.est}$, an initial estimated value of the excitation inductance or the previously calculated excitation inductance $L_{m.est}$ needs to be corrected in real time, so that values of the primary-side current $I_{pri.est}$ and the excitation inductance $L_{m.est}$ that are calculated by the current operation circuit 422 are more accurate. Further, it is beneficial to improving precision of the output voltage $V_{o.est}$ and the output current $I_{o.est}$ of the resonant power supply 10 that are calculated and that are finally obtained.

In a process of correcting the excitation inductance $L_{m.est}$, the primary-side control circuit 403 may adjust the operational amplifier gain (that is, the value of the excitation inductance $L_{m.est}$) of the third operational amplifier 63 by adjusting a resistance value of a resistor in the third operational amplifier 63 shown in FIG. 9.

Based on this, to perform real-time correction on the excitation inductance $L_{m.est}$, operation S203 may be performed before S203 is performed.

S202. Calculate the excitation inductance $L_{m.est}$ and transmit the calculated excitation inductance $L_{m.est}$ and the leakage inductance $L_{lk1}$ of the primary-side winding to the feedback circuit 402.

It can be learned from the foregoing description that the initial estimated value of the excitation inductance $L_{m.est}$ may be stored in the primary-side control circuit 403 shown in FIG. 7. Based on this, in some embodiments of this application, a correction cycle may be set in the primary-side control circuit 403. The correction cycle may include at least one switching cycle T of the bridge circuit 120. In this case, in each correction cycle, the primary-side control circuit 403 may perform S202 to calculate the excitation inductance $L_{m.est}$.

Alternatively, in some other embodiments of this application, the electric drive controller 22 shown in FIG. 3 may calculate a difference between the preset value of the output voltage (or the output current) preset in the primary-side feedback excitation power supply controller 40 and the output voltage $V_{o.est}$ (or output current $I_{o.est}$) calculated by the primary-side feedback excitation power supply controller 40. When the difference exceeds a preset threshold, the electric drive controller 22 may output a correction instruction to the primary-side control circuit 403 in the primary-side feedback excitation power supply controller 40, to enable the primary-side control circuit 403 to perform S202 based on the correction instruction, to calculate the excitation inductance $L_{m.est}$.

After the primary-side control circuit 403 performs S202, in a process in which the feedback circuit 402 can perform S203, the current operation circuit 422, shown in FIG. 7, in the feedback circuit 402 may calculate the excitation current $I_{m.est}$ and the primary-side current $I_{pri.est}$ by using the corrected excitation inductance $L_{m.est}$.

As shown in FIG. 1B, in each switching cycle T of the bridge circuit 120, a waveform of a MOS transistor in the bridge circuit 120 has a collection phase $T_{cal}$. In the collection phase $T_{cal}$, a voltage of the square wave signal $V_{hb}$ changes from a saturated on state (high level) to an off state (low level), or from an off state (low level) to a saturated conduction state (high level). A switching state of the MOS transistor is in a state that is about to switch. In addition, in the collection phase $T_{cal}$, a current actually flowing through the primary-side winding 110 of the transformer 11, that is, the actual primary-side current $I_{pri}$, is zero. Consequently, the secondary-side circuit, for example, the rectifier 30 of the transformer 11 presents an open-circuit state as being reflected to the primary side. In this case, as shown in FIG. 10, a waveform of the actual excitation current $I_{m.true}$ overlaps with a waveform of the input current $I_r$, that is, $I_{m.true}=I_r$.

In this case, in the collection phase $T_{cal}$, the primary-side control circuit 403 may calculate the excitation inductance $L_{m.est}$ and output the calculated excitation current $L_{m.est}$ to the feedback circuit 402, so that the excitation current $I_{m.est}$ calculated by the feedback circuit 402 is close to or the same as the input current $I_r$, and in some embodiments, the calculated excitation current $I_{m.est}$ is the same as the actual excitation current $I_{m.true}$. In this case, the calculated primary-side current $I_{pri.est}$ is the same as the actual primary-side current $I_{pri}$, and both are zero, so that the calculation precision is improved.

Based on this, to determine whether the resonant power supply 10 is in the collection phase $T_{cal}$, before the primary-side control circuit 403 performs S203, a control method of the primary-side control circuit 403 may further include the following: The primary-side control circuit 403 may calculate an oscillation frequency $f_r$ of the bridge circuit 120, and the following formula (4) is satisfied:

$$f_r = \frac{1}{2\pi\sqrt{(L_r + L_{lk1})C_r}}. \qquad (4)$$

In this case, a process in which the primary-side control circuit 403 performs S202 may include: A working frequency $f_{sw}$ (1/T) of the bridge circuit 120 is compared with the oscillation frequency $f_r$. When $f_{sw}<f_r$, the resonant power supply 10 has the collection phase $T_{cal}$ described above. In this case, the excitation inductance $L_{m.est}$ may be calculated.

It can be learned from the foregoing descriptions that, when $f_{sw}<f_r$, the actual primary-side current $I_{pri}$ is zero, and the waveform of the actual excitation current $I_{m.true}$ overlaps with the waveform of the input current $I_r$, and in some embodiments, values of the actual excitation current $I_{m.true}$ and the input current $I_r$ are the same. Therefore, in the primary-side control circuit 403 shown in FIG. 7, based on the excitation current $I_{m.est}$ provided by the current operation circuit 422 and the input current $I_r$ provided by the sampling circuit 401, an absolute value $|I_{m.est}|$ of the excitation current in a current switching cycle T of the bridge circuit 120 is compared with an absolute value $|I_r|$ of the input current, and a magnitude of the excitation inductance $L_{m.est}$ is adjusted, to achieve $|I_{m.est}|=|I_r|$ within a range allowed by a calculation tolerance. In this way, when the excitation inductance $L_{m.est}$ calculated by the primary-side control circuit 403 is substituted into the formula (3), the absolute value $|I_{m.est}|$ of the calculated excitation current is the same as or approximately the same as the absolute value $|I_{m.true}|$ of the actual excitation current, so that the calculated primary-side current $I_{pri.est}$ is the same as the actual primary-side current $I_{pri}$, and both are zero.

Figure 11:
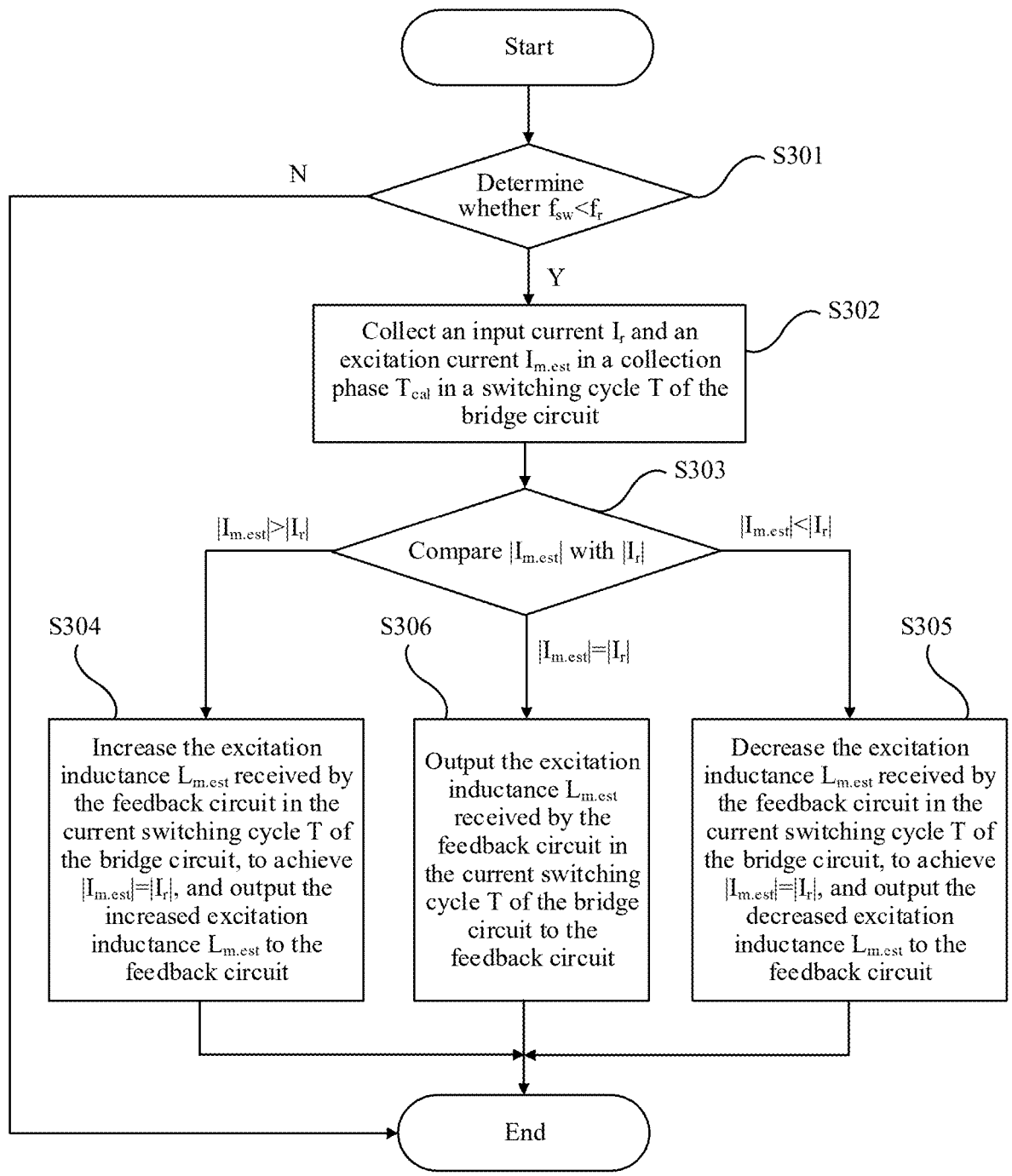
FIG. 11 is a flowchart of operations of S202 in FIG. 5.

A method for calculating the excitation inductance $L_{m.est}$ by the primary-side control circuit 403 when the primary-side control circuit 403 determines that $f_{sw}<f_r$ is described below. S202 may include S301 to S306 shown in FIG. 11.

S301. Determine whether $f_{sw}<f_r$.

The primary-side control circuit 403 starts to calculate the oscillation frequency $f_r$ of the bridge circuit 120 and compares the working frequency $f_{sw}$ with the oscillation frequency $f_r$. When $f_{sw}<f_r$, S302 is performed, and when $f_{sw}>f_r$, an end operation is performed.

S302. Collect an input current $I_r$ and an excitation current $I_{m.est}$ in a collection phase $T_{cal}$ in a switching cycle T of the bridge circuit 120. In some embodiments, when $f_{sw}<f_r$, in the collection phase $T_{cal}$ of the switching cycle T of the bridge circuit 120, the primary-side control circuit 403 may obtain the excitation current $I_{m.est}$ calculated by the current operation circuit 422 and the absolute value $|I_{m.est}|$ of the excitation current.

$T_{cal}=T/2-T_f/2$, and $T_f=1/f_r$. In this case, when $f_{sw}<f_r$, the primary-side control circuit 403 may collect, at any moment in a time period after a half of a resonance cycle Tf, that is, at any moment in the foregoing collection phase $T_{cal}$, in a half of the switching cycle T of the bridge circuit 120, the excitation current $I_{m.est}$ calculated by the current operation circuit 422. For example, when $f_{sw}<f_r$, and the primary-side control circuit 403 may collect, at an instant moment before the MOS transistor in the bridge circuit 120 switches the switching state (for example, 400 ns before the MOS transistor in the bridge circuit 120 switches the switching state), the excitation current $I_{m.est}$ calculated by the current operation circuit 422.

In addition, as shown in FIG. 7, the primary-side control circuit 403 is further electrically connected to the collection circuit 401, and the primary-side controller 403 may receive the input current $I_r$ from the collection circuit 401 and an absolute value $|I_r|$ of the input current.

S303. Compare $|I_{m.est}|$ with $|I_r|$.

The primary-side controller 403 may compare $|I_{m.est}|$ with $|I_r|$, and perform S304 when $|I_{m.est}|>|I_r|$, perform S305 when $|I_{m.est}|<|I_r|$, and perform S306 when $|I_{m.est}|=|I_r|$.

S304. Increase the excitation inductance $L_{m.est}$ received by the feedback circuit 402 in the current switching cycle T of the bridge circuit 120, to achieve $|I_{m.est}|=|I_r|$, and output the increased excitation inductance $L_{m.est}$ to the feedback circuit 402.

When the primary-side controller 403 determines that $|I_{m.est}|>|I_r|$, to enable the primary-side current $I_{pri.est}$ calculated by the feedback circuit 402 to be the same as the actual primary-side current $I_{pri}$, that is, both to be zero, the primary-side controller 403 may increase the excitation inductance $L_{m.est}$ received by the feedback circuit 402 in the current switching cycle T of the bridge circuit 120, to enable the excitation current $I_{m.est}$ calculated by the feedback circuit 402 according to formula (2) to be the same as or approximately the same as the actual excitation current $I_{m.true}$, to achieve $|I_{m.est}|=|I_r|$. Therefore, the primary-side current $I_{pri.est}$ calculated by the feedback circuit 402 according to formula (3) is zero, and is the same as the actual primary-side current $I_{pri}$.

In some embodiments of this application, to enable the primary-side controller 403 to correct the excitation inductance $L_{m.est}$, a fixed inductance adjustment value may be set. When performing S304, the primary-side controller 403 may add the inductance adjustment value to an originally calculated magnitude or a preset magnitude of the excitation inductance $L_{m.est}$, to achieve $|I_{m.est}|=|I_r|$. In addition, a correction range of the excitation inductance $L_{m.est}$ may be further set inside the primary-side controller 403, to enable a corrected value of the excitation inductance $L_{m.est}$ to always fall within the correction range. The foregoing correction range can ensure that the output voltage $V_{o.est}$ and the output current $I_{o.est}$ of the resonant power supply 10 fall within allowable parameter ranges during use of a product.

S305. Decrease the excitation inductance $L_{m.est}$ received by the feedback circuit 402 in the current switching cycle T of the bridge circuit 120, to achieve $|I_{m.est}|=|I_r|$, and output the decreased excitation inductance $L_{m.est}$ to the feedback circuit 402.

When the primary-side controller 403 determines that $|I_{m.est}|<|I_r|$, to enable the primary-side current $I_{pri.est}$ calculated by the feedback circuit 402 to be the same as the actual primary-side current $I_{pri}$, that is, both to be zero, the primary-side controller 403 may decrease the excitation inductance $L_{m.est}$ received by the feedback circuit 402 in the current switching cycle T of the bridge circuit 120, to enable the excitation current $I_{m.est}$ calculated by the feedback circuit 402 according to formula (2) to be the same as or approximately the same as the actual excitation current $I_{m.true}$, to achieve $|I_{m.est}|=|I_r|$. Therefore, the primary-side current $I_{pri.est}$ calculated by the feedback circuit 402 according to formula (3) is zero, and is the same as the actual primary-side current $I_{pri}$. In addition, the calculated excitation inductance $L_{m.est}$ can always fall within the foregoing correction range.

S306. Output the excitation inductance $L_{m.est}$ received by the feedback circuit 402 in the current switching cycle T of the bridge circuit 120 to the feedback circuit 402.

When the primary-side controller 403 determines that $|I_{m.est}|=|I_r|$, the primary-side current $I_{pri.est}$ calculated by the feedback circuit 402 according to formula (3) is zero and is the same as the actual primary-side current $I_{pri}$. In this case, the excitation inductance $L_{m.est}$ calculated by the primary-side controller 403 is the same as or approximately the same as the actual excitation inductance. Therefore, the primary-side controller 403 may output an excitation inductance $L_{m.est}$ provided to the feedback circuit 402 last time to the feedback circuit 402 again.

After S304 to S306 are performed, the primary-side controller 403 may output the calculated excitation inductance $L_{m.est}$ to the current operation circuit 422. In this way, before the excitation inductance $L_{m.est}$ is corrected next time, the current operation circuit 422 may use the foregoing calculated excitation inductance $L_{m.est}$ in a process of calculating the excitation current $I_{m.est}$ according to formula (2). Therefore, the excitation current $I_{m.est}$ and the primary-side current $I_{pri.est}$ that are calculated by the current operation circuit 422 can be more accurate.

Alternatively, in some other embodiments of this application, a method for calculating the corrected value of the excitation inductance $L_{m.est}$ by the primary-side controller 403 may be: When determining that the primary-side current $I_{pri.est}$ calculated by the feedback circuit 402 is zero, the primary-side control circuit 403 outputs the excitation inductance $L_{m.est}$ received by the feedback circuit 402 in a current switching cycle T of the bridge circuit 120 the feedback circuit 402.

In this way, when the primary-side control circuit 403 determines that the primary-side current $I_{pri.est}$ calculated by the feedback circuit 402 is zero, the calculated primary-side current $I_{pri.est}$ is the same as the actual primary-side current $I_{pri}$, that is, both are zero. In this case, the excitation inductance $L_{m.est}$ calculated by the primary-side controller 403 is the same as or approximately the same as the actual excitation inductance. Therefore, the primary-side controller 403 may output an excitation inductance $L_{m.est}$ provided to the feedback circuit 402 last time to the feedback circuit 402 again.

It should be noted that the transformer 11 has different air gap distances between an ideal axis position and an actual axis position of the secondary-side winding 111 of the transformer 11 under different installation tolerances or during transportation or use. A change in a value of the actual excitation inductance $L_m$ is greatly affected by the air gap distance. Therefore, before the resonant power supply 10 or the entire control apparatus 01 is delivered from the factory, the primary-side controller 403 may calculate the excitation inductance $L_{m.est}$, to enable the calculated excitation inductance $L_{m.est}$ to be the same as or approximately the same as the actual excitation inductance, to alleviate the problem of a large difference between values of the calculated excitation inductance $L_{m.est}$ and the actual excitation inductance $L_m$ due to the installation tolerance.

Alternatively, after the resonant power supply 10 or the entire control apparatus 01 is transported to the destination, the primary-side controller 403 may calculate the excitation inductance $L_{m.est}$, to decrease a difference between values of the calculated excitation inductance $L_{m.est}$ and the actual excitation inductance $L_m$ due to the transportation. In addition, after the resonant power supply 10 or the entire control apparatus 01 is transported to the destination and put into normal operation, mechanical components of the resonant power supply 10 or the entire control apparatus 01 may be in a stable state, and in this case, the value of the actual excitation inductance $L_m$ is in a stable state. In this case, the primary side controller 403 may stop calculating the excitation inductance $L_{m.est}$. Alternatively, when mechanical parts of the resonant power supply 10 or the entire control apparatus 01 are in a stable state, and the value of the actual excitation inductance $L_m$ is in a stable state, if the output voltage $V_{o.est}$ and the calculated output current $I_{o.est}$ of the resonant power supply 10 that are calculated do not meet a preset precision requirement, it indicates that the actual axis position of the secondary-side winding 111 of the transformer 11 has seriously deviated. The primary-side feedback excitation power supply controller 40 or the electric drive controller 22 shown in FIG. 3 may issue an alarm signal. The alarm signal is for indicating a user to adjust the actual axis position of the secondary-side winding 111 of the transformer 11, to make the actual axis position of the secondary-side winding 111 close to an ideal axis position.

After calculating the excitation inductance $L_{m.est}$, the feedback circuit 402 shown in FIG. 7 is further configured to perform S204.

S204. Calculate the output voltage $V_{o.est}$ and the output current $I_{o.est}$ of the resonant power supply 10 based on the excitation voltage $V_{m.est}$ and the primary-side current $I_{pri.est}$.

As shown in FIG. 7, the feedback circuit 402 may include an output voltage-current operation circuit 432. The output voltage-current operation circuit 432 is electrically connected to the voltage operation circuit 412, the current operation circuit 422, and the primary-side control circuit 403. The output voltage-current operation circuit 432 is configured to receive the excitation voltage $V_{m.est}$ output by the voltage operation circuit 412 and the primary-side current $I_{pri.est}$ output by the current operation circuit 422, and perform S204.

Figure 12:
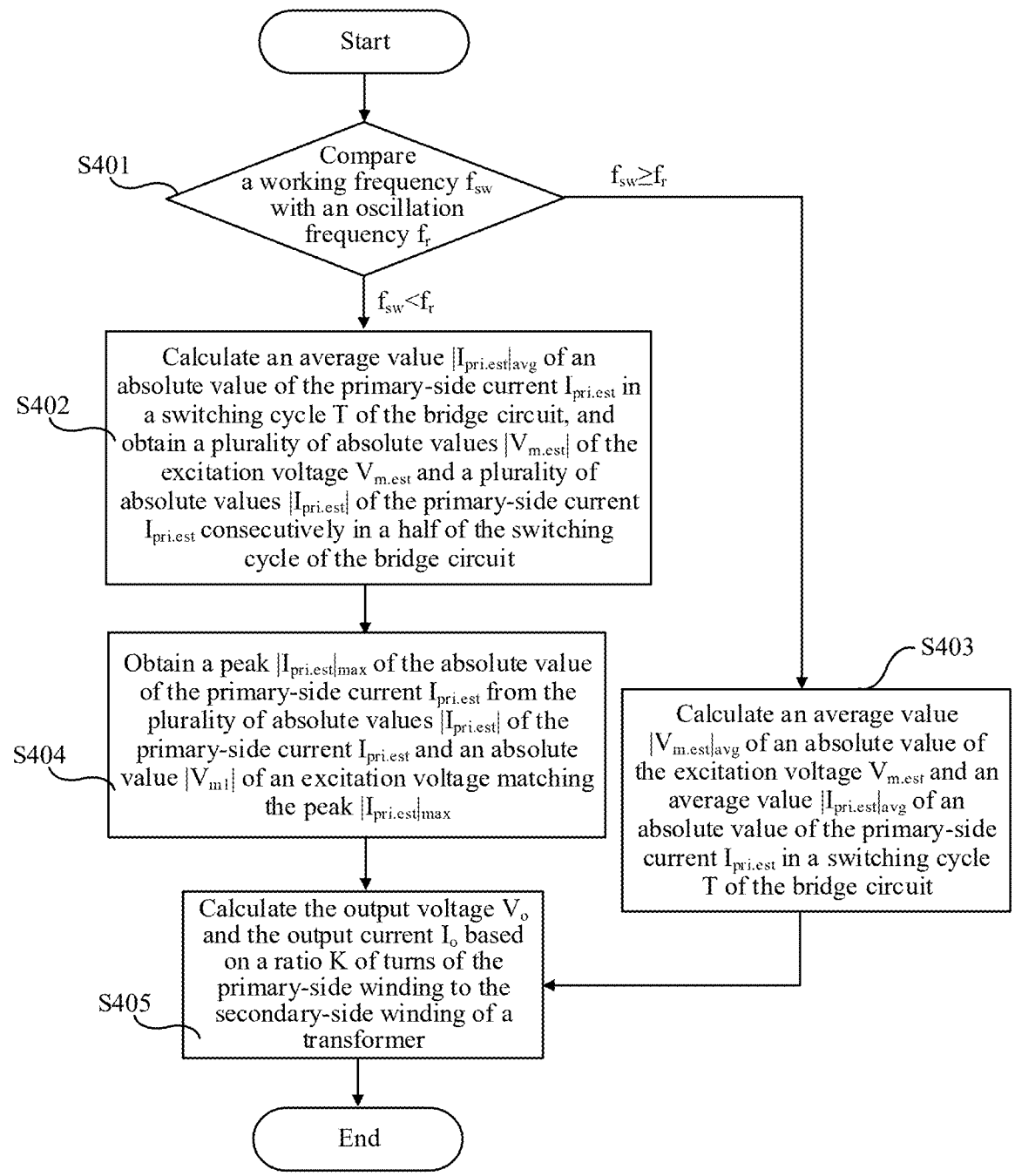
FIG. 12 is a flowchart of operations of S102 in FIG. 4.

Before the output voltage-current operation circuit 432 performs S204, the primary-side control circuit 403 may calculate the oscillation frequency $f_r$ of the bridge circuit 120 and perform operation S401 shown in FIG. 12, to compare the working frequency $f_{sw}$ with the oscillation frequency $f_r$. Based on a comparison result between the working frequency $f_{sw}$ and the oscillation frequency $f_r$, the output voltage-current operation circuit 432 performs the process of S204, which may include S402 to S405 shown in FIG. 12. When $f_{sw}$-$f_r$, S403 is performed, and when $f_{sw}<f_r$, operation S402 is performed.

S403. Calculate an average value $|V_{m.est}|_{avg}$ of an absolute value of the excitation voltage $V_{m.est}$ and an average value $|I_{pri.est}|_{avg}$ of an absolute value of the primary-side current $I_{pri.est}$ in a switching cycle T of the bridge circuit 120.

Figure 13A:
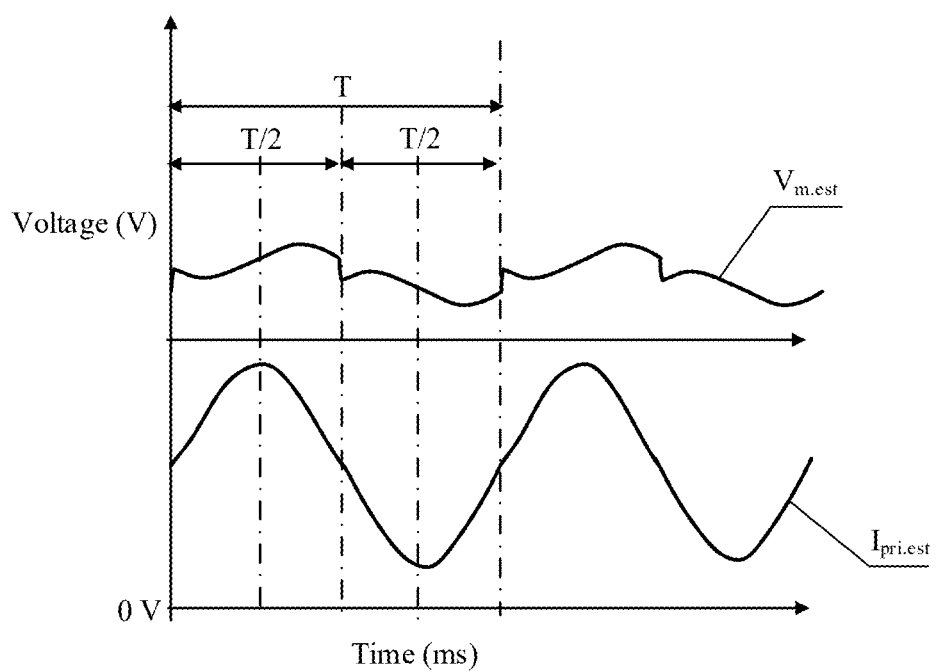
FIG. 13A is a waveform diagram of an excitation voltage, a voltage reflected by an output voltage to a primary side, and a primary-side current according to an embodiment of this application.

When the primary-side control circuit 403 (as shown in FIG. 7) determines that $f_{sw}\geq f_r$, as shown in FIG. 13A, a waveform of the excitation voltage $V_{m.est}$ has an alternating-current component in the switching cycle T. The alternating-current component is mainly caused by a leakage inductance $L_{lk2}$ fed back from the secondary-side winding 111 in the transformer 11 to the primary side, and an average value of voltages of the alternating-current component in one switching cycle T is zero. Therefore, impact of the leakage inductance $L_{lk2}$ fed back from the secondary-side winding 111 to the primary side on the excitation voltage $V_{m.est}$ is negligible.

In this case, when $f_{sw}\geq f_r$, an alternating voltage on the secondary-side winding 111 of the transformer 11 may be the same as the excitation voltage $V_{m.est}$ when being reflected to the primary side (after conversion based on the ratio K of turns). It can be learned from the foregoing descriptions that only after the rectifier 30 converts an alternating current on the secondary-side winding 111 into a direct current, the excitation voltage $V_{m.est}$ can be used as the output voltage $V_{o.est}$ of the resonant power supply 10. Therefore, the output voltage-current operation circuit 432 can calculate the absolute value (abs) $|V_{m.est}|$ of the excitation voltage in one switching cycle T of the bridge circuit 120. Then, the average value $|V_{m.est}|_{avg}$ of absolute values of the excitation voltage in the switching cycle T is further calculated. Therefore, the output voltage $V_{o.est}$ of the resonant power supply 10 can be calculated based on the average value $|V_{m.est}|_{avg}$ of the absolute value of the excitation voltage. It can be learned from the foregoing that the value of the excitation voltage $V_{m.est}$ does not change greatly with the change in the air gap distance. Therefore, the value of the output voltage $V_{o.est}$ calculated based on the excitation voltage $V_{m.est}$ may have high precision.

In addition, similarly, when $f_{sw}\geq f_r$, an alternating current on the secondary-side winding 111 of the transformer 11 may be the same as the primary-side current $I_{pri.est}$ after being reflected to the primary side (after conversion based on the ratio K of turns). It can be learned from the foregoing descriptions that only after the rectifier 30 converts an alternating current on the secondary-side winding 111 into a direct current, the primary-side current $I_{pri.est}$ can be used as the output current $I_{o.est}$ of the resonant power supply 10. Therefore, the output voltage-current operation circuit 432 can calculate the absolute value $|I_{pri.est}|$ of the primary-side current $I_{pri.est}$ in one switching cycle T of the bridge circuit 120. Then, the average value $|I_{pri.est}|_{avg}$ of absolute values of the primary-side current $I_{pri.est}$ in the switching cycle T is further calculated. Therefore, the output current $I_{o.est}$ of the resonant power supply 10 can be calculated based on the average value $|I_{pri.est}|_{avg}$ of the absolute value of the primary-side current $I_{pri.est}$.

Figure 14:
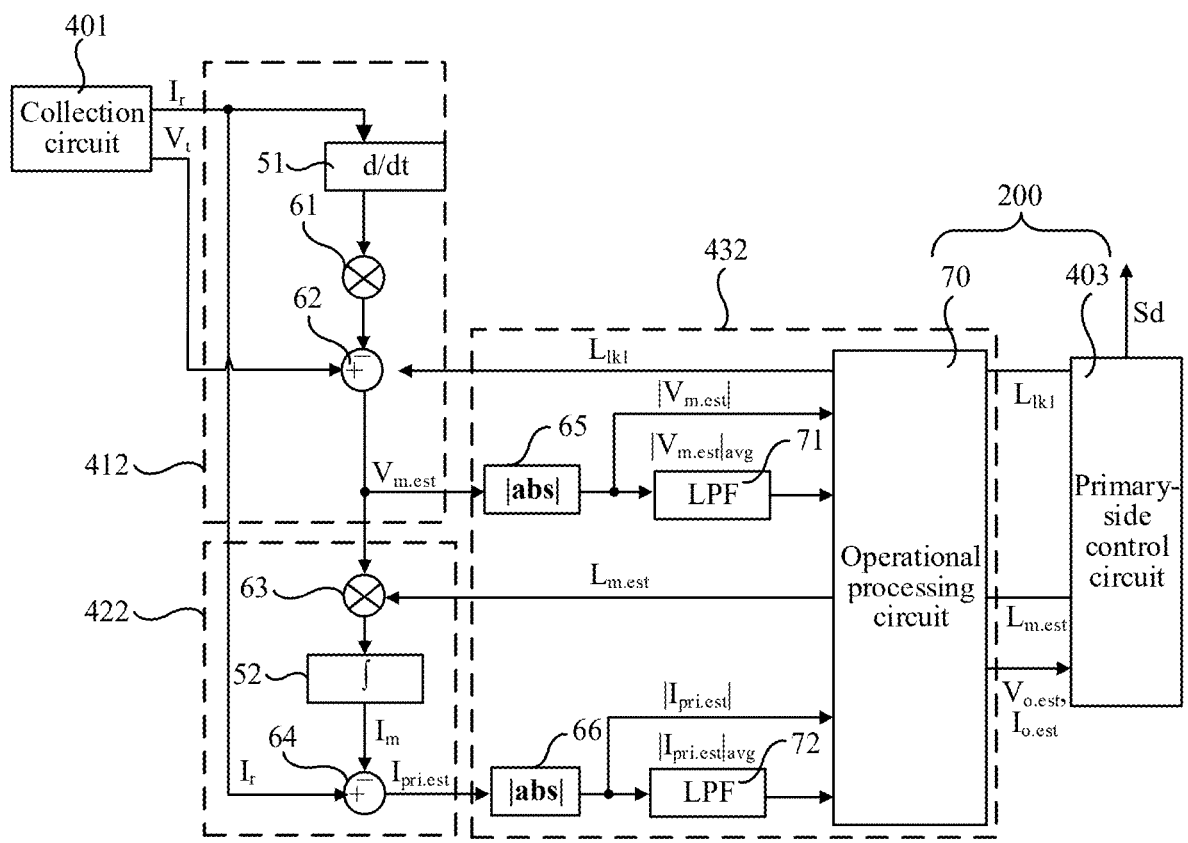
FIG. 14 is a schematic diagram of a structure of another control apparatus according to an embodiment of this application.

In this case, as shown in FIG. 14, the output voltage-current operation circuit 432 may include a fifth operational amplifier 65, a first low-pass filter (LPF) 71, a sixth operational amplifier 66, a second low-pass filter 72, and an operational processing circuit 70.

The fifth operational amplifier 65 may be electrically connected to the second operational amplifier 62 and the operational processing circuit 70. The fifth operational amplifier 65 is configured to calculate an absolute value $|V_{m.est}|$ of the excitation voltage $V_{m.est}$, and output the absolute value $|V_{m.est}|$ to the operational processing circuit 70. The first low-pass filter 71 is electrically connected to the fifth operational amplifier 65 and the operational processing circuit 70. The first low-pass filter 71 is configured to receive an absolute value $|V_{m.est}|$ of the excitation voltage $V_{m.est}$ provided by the fifth operational amplifier 65, calculate an average value $|V_{m.est}|_{avg}$ of the absolute value of the excitation voltage $V_{m.est}$, and output a calculation result to the operational processing circuit 70.

The sixth operational amplifier 66 may be electrically connected to the fourth operational amplifier 64 and the operational processing circuit 70. The sixth operational amplifier 66 is configured to calculate an absolute value $|I_{pri.est}|$ of the primary-side current $I_{pri.est}$, and output the absolute value $|I_{pri.est}|$ to the operational processing circuit 70. The second low-pass filter 72 may be electrically connected to the sixth operational amplifier 66 and the operational processing circuit 70. The second low-pass filter 72 is configured to receive an absolute value $|I_{pri.est}|$ of the primary-side current $I_{pri.est}$ provided by the sixth operational amplifier 66, calculate an average value $|I_{pri.est}|_{avg}$ of the absolute value of the primary-side current $I_{pri.est}$, and output a calculation result to the operational processing circuit 70.

S405. Calculate the output voltage $V_{o.est}$ and the output current $I_{o.est}$ of the resonant power supply 10 based on a ratio K of turns of the primary-side winding 110 to the secondary-side winding 111.

When $f_{sw} \geq f_r$, after the output voltage-current operation circuit 432 performs S403, as shown in FIG. 14, the operational processing circuit 70 in the output voltage-current operation circuit 432 calculates the output voltage $V_{o.est}$ based on the average value $|V_{m.est}|_{avg}$ of the absolute value of the excitation voltage $V_{m.est}$ calculated by the first low-pass filter 71, and a ratio K ($K=N_p/N_s$) of turns of the primary-side winding 110 to the secondary-side winding 111. The output voltage $V_{o.est}$ satisfies the following formula:

$$V_{o.est} = \frac{1}{K} \times |V_{mest}|_{avg}.$$

In addition, when $f_{sw} \geq f_r$, after the output voltage-current operation circuit 432 performs S403, as shown in FIG. 14, the operational processing circuit 70 in the output voltage-current operation circuit 432 calculates the output current $I_{o.est}$ based on the average value $|I_{pri.est}|_{avg}$ of the absolute value of the primary-side current $I_{pri.est}$ calculated by the second low-pass filter 72, and a ratio K ($K=N_p/N_s$) of turns of the primary-side winding 110 to the secondary-side winding 111. The output current $I_{o.est}$ satisfies the following formula:

$$I_{o.est} = \frac{1}{K} \times |I_{pri.est}|_{avg}.$$

S402: Calculate an average value $|I_{pri.est}|_{avg}$ of an absolute value of the primary-side current $I_{pri.est}$ in a switching cycle T of the bridge circuit 120, and obtain a plurality of absolute values $|V_{m.est}|$ of the excitation voltage $V_{m.est}$ and a plurality of absolute values $|I_{pri.est}|$ of the primary-side current $I_{pri.est}$ consecutively in a half of the switching cycle (T/2) of the bridge circuit 120.

Figure 13B:
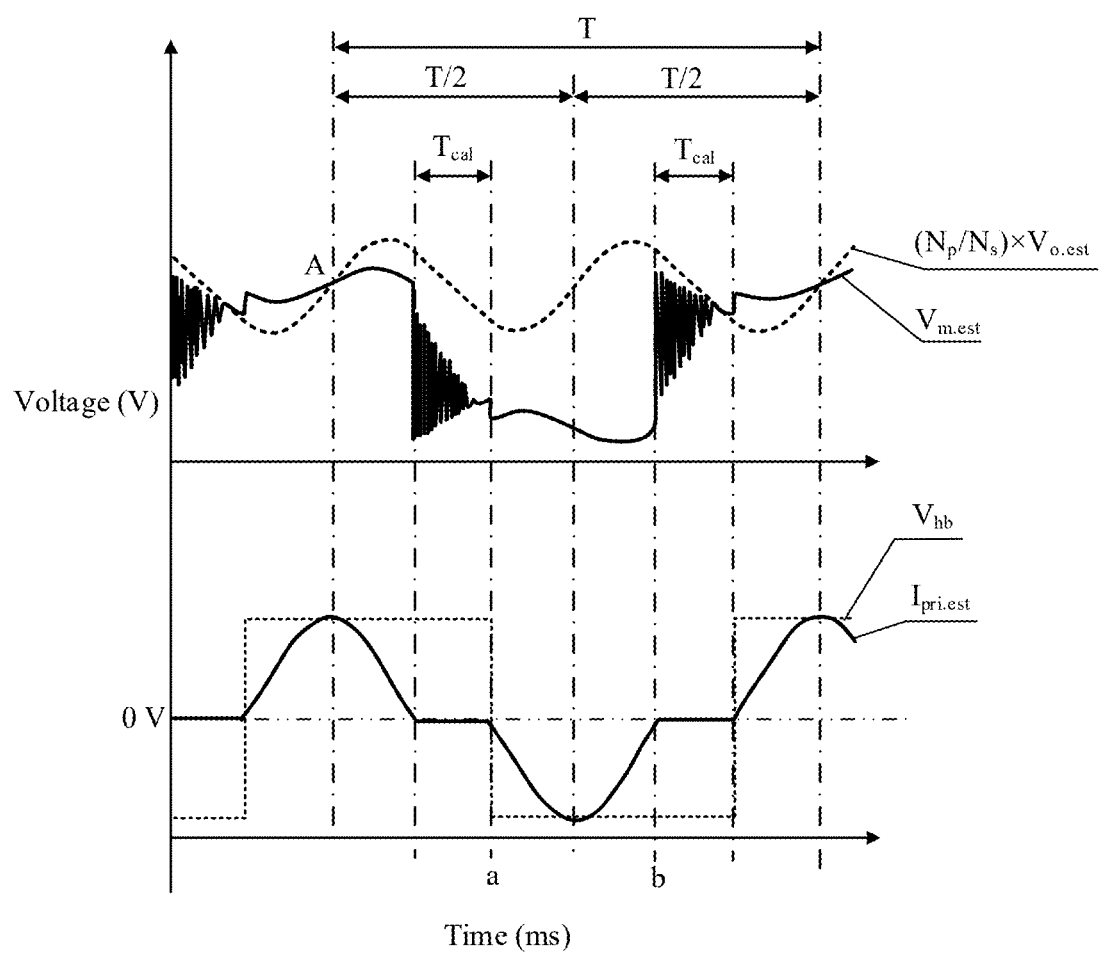
FIG. 13B is another waveform diagram of an excitation voltage and a primary-side current according to an embodiment of this application.

When the primary-side control circuit 403 (as shown in FIG. 7) determines that $f_{sw} < f_r$, one switching cycle T of the bridge circuit 120 has a collection phase $T_{cal}$ shown in FIG. 13B. It can be learned from the foregoing description that, in the collection phase $T_{cal}$, a current actually flowing through the primary-side winding 110 of the transformer 11, that is, a primary-side current $I_{pri}$, is zero, as shown in FIG. 13B. The secondary-side circuit of the transformer 11, for example, the rectifier 30, presents an open-circuit state as being reflected to the primary side, and the secondary-side circuit of the transformer 11 has a current deadband. In this case, the average value $|V_{m.est}|_{avg}$ of the absolute values of the excitation voltage $V_{m.est}$ is superimposed onto an open-circuit voltage of the rectifier 30. Therefore, if the output voltage $V_{o.est}$ is calculated by using the average value $|V_{m.est}|_{avg}$ of the absolute value of the excitation voltage $V_{m.est}$, an obtained value of the output voltage $V_{o.est}$ is inaccurate.

In addition, as shown in FIG. 13B, when $f_{sw} < f_r$ (in the collection phase $T_{cal}$ described above), the primary-side current $I_{pri.est}$ is zero, and the slope ($dI_{pri.est}/dt$) of the primary-side current $I_{pri.est}$ is zero. Furthermore, in every half cycle (T/2) of the switching cycle T, the slope ($dI_{pri.est}/dt$) of the primary-side current $I_{pri.est}$ at its peak position is zero. In this case, an excitation voltage $V_{m.est}$ corresponding to the primary-side current $I_{pri.est}$ at its peak position is the same as a voltage $(N_p/N_s) \times V_{o.est}$ of the output voltage $V_{o.est}$ reflected to the primary side at a point A shown in FIG. 13B. Therefore, the output voltage $V_{o.est}$ can be calculated using the excitation voltage $V_{m.est}$ corresponding to the primary-side current $I_{pri.est}$ at its peak position.

In this case, when the output voltage-current operation circuit 432 performs S402, as shown in FIG. 14, in the operational processing circuit 70 of the output voltage-current operation circuit 432, in a half cycle (T/2) of the switching cycle T, the plurality of absolute values $|V_{m.est}|$ of the excitation voltage $V_{m.est}$ may be consecutively obtained through the fifth operational amplifier 65. In addition, the operational processing circuit 70 may further consecutively obtain a plurality of absolute values $|I_{pri.est}|$ of primary-side current $I_{pri.est}$ through the sixth operational amplifier 66.

S404. Obtain a peak $|I_{pri.est}|_{max}$ of the absolute value of the primary-side current $I_{pri.est}$ from the plurality of absolute values $|I_{pri.est}|$ of the primary-side current $I_{pri.est}$ and an absolute value $|V_{m1}|$ of an excitation voltage matching the peak $|I_{pri.est}|_{max}$.

When the output voltage-current operation circuit 432 performs S404, as shown in FIG. 14, the operational processing circuit 70 in the output voltage-current operation circuit 432 may obtain the peak $|I_{pri.est}|_{max}$ of the absolute value of the primary-side current $I_{pri.est}$ from the plurality of absolute values $|I_{pri.est}|$ of the primary-side current $I_{pri.est}$. In addition, the input/output voltage-current operation circuit 432 may further obtain the absolute value $|V_{m1}|$ of the excitation voltage matching the peak $|I_{pri.est}|$ max.

Next, after the output voltage-current operation circuit 432 performs S404, the operational processing circuit 70 in the output voltage-current operation circuit 432 may perform S405, to calculate the output voltage $V_{o.est}$ based on the ratio K of turns ($K=N_p/N_s$) of the primary-side winding 110 to the secondary-side winding 111 and the absolute value $|V_{m1}|$ of the excitation voltage matching the peak $|I_{pri.est}|_{max}$. The output voltage $V_{o.est}$ satisfies the following formula:

$$V_{o.est} = \frac{1}{K} \times |V_{m1}|.$$

In addition, the foregoing operational processing circuit 70 may calculate the output current $I_{o.est}$ based on the ratio K of turns ($K=N_p/N_s$) of the primary-side winding 110 to the secondary-side winding 111 and the average value $|I_{pri.est}|_{avg}$ of the absolute value of the primary-side current $I_{pri.est}$. The output current $I_{o.est}$ satisfies the following formula:

$$I_{o.est} = \frac{1}{K} \times |I_{pri.est}|_{avg}.$$

S102. Output a drive signal Sd to the bridge circuit 120.

As shown in FIG. 7, the output voltage-current operation circuit 432 in the feedback circuit 402 may transmit the calculated output voltage $V_{o.est}$ and output current $I_{o.est}$ of the resonant power supply 10 to the primary-side control circuit 403. Therefore, after receiving the output voltage $V_{o.est}$ and the output current $I_{o.est}$, the primary-side control circuit 403 may perform S102 under the control of the electric drive controller 22 (as shown in FIG. 3). In this way, as shown in FIG. 14, the primary-side control circuit 403 can adjust, based on the output voltage $V_{o.est}$ and the output current $I_{o.est}$, under control of the electric drive controller 22, the drive signal Sd provided to the bridge circuit 120, so that closed-loop control can be performed on the resonant power supply 10.

In some embodiments of this application, the primary-side control circuit 403 and the operational processing circuit 70 in the output voltage-current operation circuit 432 may be integrated into a same electronic component. For example, the chip may be a digital signal processor 200 shown in FIG. 14.

It can be learned from the foregoing description that, in a process of supplying power to the load 20 by the resonant power supply 10 provided in this embodiment of this application, the primary-side feedback excitation power supply controller in the resonant power supply 10 includes a collection circuit 401, a feedback circuit 402, and a primary-side control circuit 403 shown in FIG. 6. The feedback circuit 402 may calculate the excitation voltage $V_{m.est}$ and the primary-side current $I_{pri.est}$ based on the input voltage $V_t$ and the input current $I_r$ collected by the collection circuit 401, the excitation inductance $L_{m.est}$ output by the primary-side control circuit 403, and the leakage inductance $L_{lk1}$ of the primary-side winding. In addition, the feedback circuit 402 may further calculate the output voltage $V_{o.est}$ and the output current $I_{o.est}$ of the resonant power supply 10 based on the excitation voltage $V_{m.est}$ and the primary-side current $I_{pri.est}$.

When results of comparison between the oscillation frequency $f_r$ of the bridge circuit 120 and the working frequency $f_{sw}$ of the bridge circuit 120 performed by the primary-side control circuit 403 are different, manners in which the feedback circuit 402 calculates the output voltage $V_{o.est}$ and the output current $I_{o.est}$ of the resonant power supply 10 based on the excitation voltage $V_{m.est}$ and the primary-side current $I_{pri.est}$ are also different.

For example, when $f_{sw} \geq f_r$, the output voltage $V_{o.est}$ can be directly calculated using an average value $|V_{m.est}|_{avg}$ of the absolute value of the excitation voltage $V_{m.est}$ in one switching cycle T of the bridge circuit 120. Therefore, the feedback circuit 402 may calculate the output voltage $V_{o.est}$ based on the calculated average value $|V_{m.est}|_{avg}$ of the excitation voltage $V_{m.est}$ in the switching cycle T of the bridge circuit 120 and the ratio K of turns of the primary-side winding 110 to the secondary-side winding 111. In addition, the feedback circuit 402 may calculate the average value $|I_{pri.est}|_{avg}$ of the primary-side current $I_{pri.est}$ in a switching cycle T of the bridge circuit 120, and calculate the output current $I_{o.est}$ with reference to the ratio K of turns.

In addition, when $f_{sw} < f_r$, the secondary-side circuit of the transformer 11, for example, the rectifier 30, presents an open-circuit state as being reflected to the primary side. In this case, the average value $|V_{m.est}|_{avg}$ of the excitation voltage $V_{m.est}$ in a switching cycle T of the bridge circuit 120 is superimposed onto the open-circuit voltage of the rectifier 30. Therefore, the output voltage $V_{o.est}$ cannot be calculated directly using the average value $|V_{m.est}|_{avg}$ of the excitation voltage $V_{m.est}$.

In this case, to improve the precision of calculating the output voltage $V_{o.est}$ and the output current $I_{o.est}$, the feedback circuit 402 may obtain a plurality of absolute values $|V_{m.est}|$ of the excitation voltage $V_{m.est}$ and a plurality of absolute values $|I_{pri.est}|$ of the primary-side current $I_{pri.est}$ consecutively in a half of the switching cycle T of the bridge circuit 120. Then, a peak $|I_{pri.est}|_{max}$ of the absolute value of the primary-side current $I_{pri.est}$ is obtained from the plurality of absolute values $|I_{pri.est}|$ of the primary-side current $I_{pri.est}$ and an absolute value $|V_{m1}|$ of an excitation voltage matching the peak $|I_{pri.est}|_{max}$. Next, the feedback circuit 402 may calculate the output voltage $V_{o.est}$ based on the absolute value $|V_{m1}|$ of the excitation voltage matching the peak $|I_{pri}|_{max}$ and the ratio K of turns. In addition, the feedback circuit 402 may calculate the output current $I_{o.est}$ based on the average value $|I_{pri.est}|_{avg}$ of the absolute value of the primary-side current $I_{pri.est}$ and the ratio K of turns.

Figure 15:
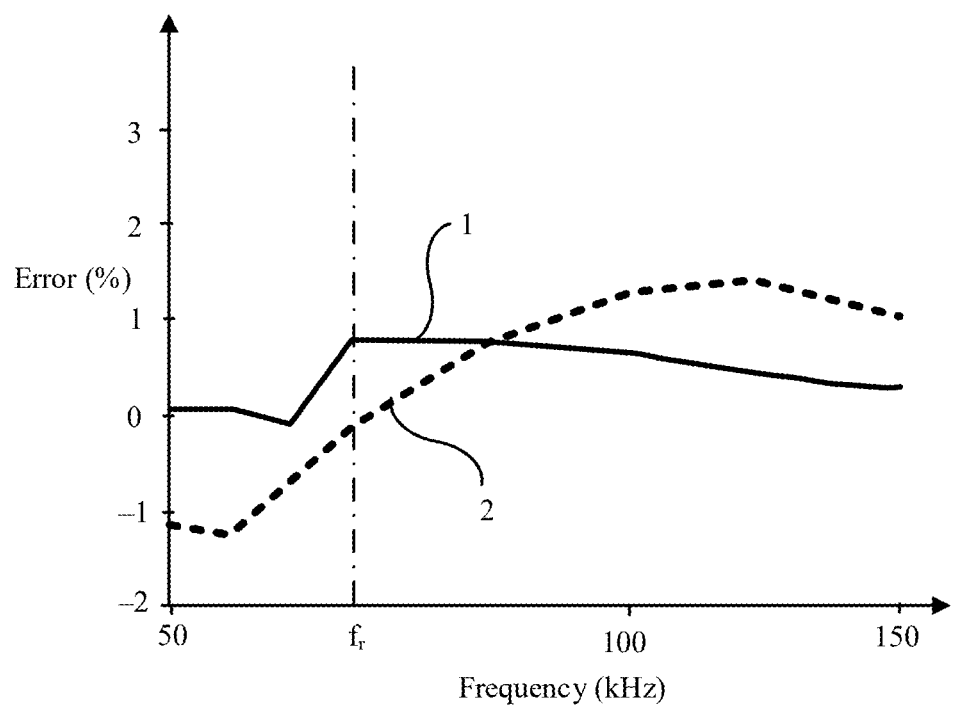
FIG. 15 is a waveform diagram of errors of an output voltage and an output current according to an embodiment of this application.

In this way, in a process of obtaining the output voltage $V_{o.est}$ and the output current $I_{o.est}$ by using the resonant power supply 10 provided in this embodiment of this application, the excitation inductance $L_{m.est}$ is corrected in the switching cycle T of the bridge circuit 120 through the primary-side control circuit 403. In addition, the oscillation frequency $f_r$ of the bridge circuit 120 is compared with the working frequency $f_{sw}$ of the bridge circuit 120, and the output voltage $V_{o.est}$ and the output current $I_{o.est}$ of the resonant power supply 10 are calculated in different manners based on different comparison results. Therefore, an error of the output voltage $V_{o.est}$ obtained by using the resonant power supply 10 provided in this embodiment of this application is shown in curve 1 in FIG. 15, and an error of the output current $I_{o.est}$ is shown in curve 2 in FIG. 15. It can be learned from the curve 1 and the curve 2 that when $f_{sw} < f_r$ or $f_{sw} \geq f_r$, both an absolute value of the error of the output voltage $V_{o.est}$ and an absolute value of the error of the output current $I_{o.est}$ may be less than 1.5%.

Compared with this application, using an example in which the working frequency $f_{sw}$ of the bridge circuit 120 is 50 kHz, when the primary-side control circuit 403 does not correct the excitation inductance $L_{m.est}$ in the switching cycle T of the bridge circuit 120, and instead always uses an estimated value of the excitation inductance, as shown in Table 2, the error of the output current $I_{o.est}$ increases as the error of the excitation inductance $L_{m.est}$ increases.

TABLE 2

| Error of excitation inductance $L_{m.est}$ | Error of output current $I_{o.est}$ |
|---|---|
| 0% | −1.12% |
| −30% | 8.57% |

It can be seen from Table 2 that when the transformer 11 is under different installation tolerances or during transportation or use, the absolute value of the error of the excitation inductance $L_{m.est}$ increases from 0 to 30%, the absolute value of the error of the output current $I_{o.est}$ increases from 1.12% to 8.57%, which is higher than an absolute value (1.5%) of the error of the output current $I_{o.est}$ in this application.

Figure 16:
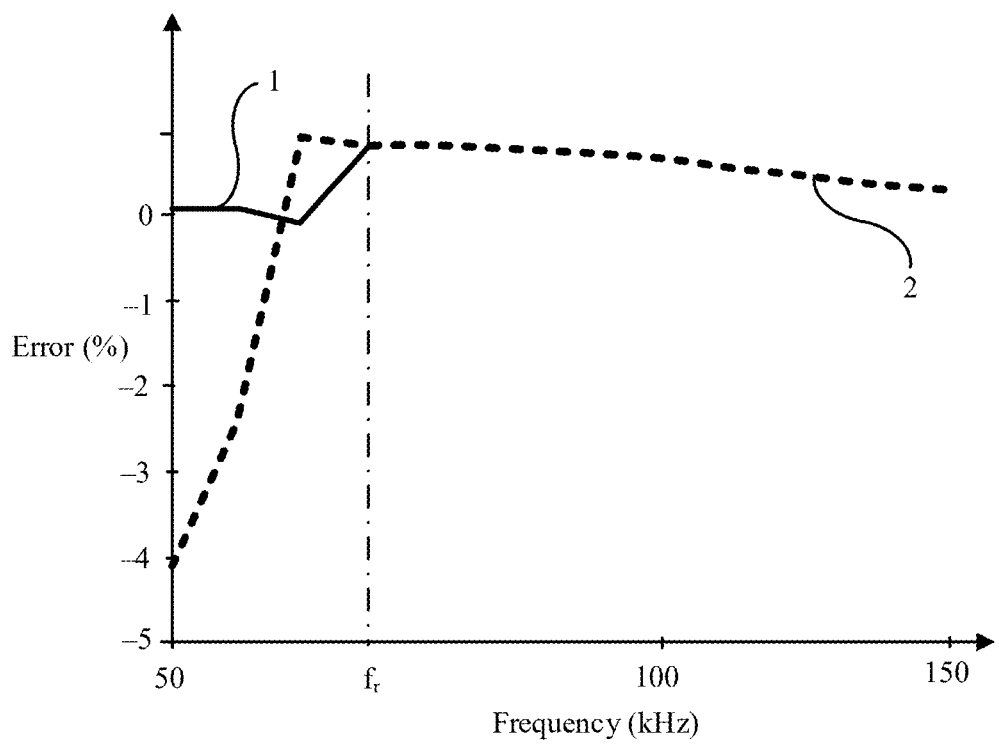
FIG. 16 is a waveform diagram of an error of an output voltage according to an embodiment of this application.

In addition, when $f_{sw} < f_r$, the secondary-side circuit of the transformer 11, for example, the rectifier 30, presents an open-circuit state as being reflected to the primary side. In this case, if the output voltage $V_{o.est}$ is still calculated by using the average value $|V_{m.est}|_{avg}$ of the excitation voltage $V_{m.est}$, the error of the output voltage $V_{o.est}$ may reach 4% as indicated by the error curve 2 in FIG. 16.

However, in this application, when $f_{sw} < f_r$, the output voltage $V_{o.est}$ is not calculated using the average value $|V_{m.est}|_{avg}$ of the excitation voltage $V_{m.est}$ anymore. Therefore, when the output voltage $V_{o.est}$ is calculated, as indicated by error curve 1 in FIG. 16, the error of the output voltage $V_{o.est}$ may be about 1%. Therefore, in the resonant power supply 10 provided in this application, that the primary-side feedback excitation power supply controller 40 is electrically connected to the primary-side winding 110, to simplify the secondary-side circuit in the transformer 11, and further ensure that the calculated output voltage $V_{o.est}$ and the calculated output current $I_{o.est}$ have high precision, to prevent the primary-side feedback excitation power supply controller 40 from being affected by a high eccentricity and a high temperature when the primary-side feedback excitation power supply controller 40 operates at a high speed with the rotating shaft.

The foregoing description is made by using an example in which the control method of the primary-side feedback excitation power supply controller 40 is implemented by using various electronic components shown in FIG. 14. Alternatively, embodiments of this application further provide a computer-readable storage medium. The computer-readable storage medium may include computer instructions. When the computer instructions are run on the primary-side feedback excitation power supply controller 40 in the control apparatus 01, the primary-side feedback excitation power supply controller 40 is enabled to perform the control method.

In addition, embodiments of this application further provide a computer program product. The computer program product includes computer instructions. When the computer instructions are run on the primary-side feedback excitation power supply controller 40 in the control apparatus 01, the primary-side feedback excitation power supply controller 40 is enabled to perform the control method.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resonant power supply, comprising:
   a transformer, comprising a primary-side winding and a secondary-side winding;
   a bridge circuit, electrically connected to a power supply, and configured to convert, based on a drive signal, a first direct current provided by the power supply into a square wave signal;
   an LC series resonant network, electrically connected to the bridge circuit and the primary-side winding, and configured to convert the square wave signal into a first alternating current, and output the first alternating current to the primary-side winding, wherein the first alternating current comprises an input voltage $V_t$ and an input current $I_r$;
   a rectifier bridge, electrically connected to the secondary-side winding, and configured to convert a second alternating current produced on the secondary-side winding into a second direct current; and
   a primary-side feedback excitation power supply controller, electrically connected to the primary-side winding, the bridge circuit, and the LC series resonant network, and configured to:
   receive the input voltage $V_t$ and the input current $I_r$;
   calculate an excitation inductance $L_{m.est}$ based on the input current $I_r$; and
   output the drive signal to the bridge circuit, wherein the drive signal is based on the input voltage $V_t$, the input current $I_r$, and the excitation inductance $L_{m.est}$.

2. The resonant power supply according to claim 1, wherein the primary-side feedback excitation power supply controller is configured to:
   calculate an output voltage $V_{o.est}$ and an output current $I_{o.est}$ of the resonant power supply based on the input voltage $V_t$, the input current $I_r$, a leakage inductance $L_{lk1}$ of the primary-side winding, and the excitation inductance $L_{m.est}$;
   wherein the drive signal is further based on the output voltage $V_{o.est}$ and the output current $I_{o.est}$ of the resonant power supply.

3. The resonant power supply according to claim 2, wherein the primary-side feedback excitation power supply controller comprises:
   a collection circuit, electrically connected to the primary-side winding, and configured to collect the input voltage $V_t$ and the input current $I_r$;
   a feedback circuit, electrically connected to the collection circuit, and configured to calculate an excitation voltage $V_{m.est}$, an excitation current $I_{m.est}$, and a primary-side current $I_{pri.est}$ based on the input voltage $V_t$, the input current $I_r$, the leakage inductance $L_{lk1}$ of the primary-side winding, and the excitation inductance $L_{m.est}$, and calculate the output voltage $V_{o.est}$ and the output current $I_{o.est}$ of the resonant power supply based on the excitation voltage $V_{m.est}$ and the primary-side current $I_{pri.est}$ that are calculated, wherein $$V_{m.est} = V_t - L_{lk1} \frac{dI_r}{dt};$$

$$I_{m.est} = \frac{1}{L_{m.est}} \int V_{m.est} dt; \text{ and}$$

$$I_{pri.est} = I_r - I_{m.est};$$

and
   a primary-side control circuit, electrically connected to the feedback circuit and the bridge circuit, and configured to calculate the excitation inductance $L_{m.est}$, and transmit the leakage inductance $L_{lk1}$ of the primary-side winding and the excitation inductance $L_{m.est}$ to the feedback circuit.

4. The resonant power supply according to claim 3, wherein an inductance value of a resonant inductor in the LC series resonant network is $L_r$, and a capacitance value of a resonant capacitor is $C_r$, and wherein the primary-side control circuit is further configured to calculate an oscillation frequency $f_r$ of the bridge circuit, wherein $$f_r = \frac{1}{2\pi\sqrt{(L_r + L_{lk1})C_r}};$$

and
   the primary-side control circuit is configured to:
   compare a working frequency $f_{sw}$ of the bridge circuit with the oscillation frequency $f_r$;
   compare, when $f_{sw} < f_r$, in a collection phase $T_{cal}$ in one switching cycle T of the bridge circuit, an absolute value $|I_{m.est}|$ of the excitation current $I_{m.est}$ calculated by the feedback circuit in a current switching cycle T of the bridge circuit with an absolute value $|I_r|$ of the input current $I_r$;

increase, when $|I_{m.est}|>|I_r|$, the excitation inductance $L_{m.est}$ received by the feedback circuit in the current switching cycle T of the bridge circuit, to achieve $|I_{m.est}|=|I_r|$, and output the increased excitation inductance $L_{m.est}$ to the feedback circuit;

decrease, when $|I_{m.est}|<|I_r|$, the excitation inductance $L_{m.est}$ received by the feedback circuit in the current switching cycle T of the bridge circuit, to achieve $|I_{m.est}|=|I_r|$, and output the decreased excitation inductance $L_{m.est}$ to the feedback circuit; and output, when $|I_{m.est}|=|I_r|$, the excitation inductance $L_{m.est}$ received by the feedback circuit in the current switching cycle T of the bridge circuit to the feedback circuit, wherein $$T_{cal}=T/2-T_f/2, \text{ and } T_f=1/f_r.$$

5. The resonant power supply according to claim 4, wherein the feedback circuit comprises:

a voltage operation circuit, electrically connected to the collection circuit and the primary-side control circuit, and configured to calculate the excitation voltage $V_{m.est}$ based on the input voltage $V_r$, the input current $I_r$, and the leakage inductance $L_{lk1}$ of the primary-side winding provided by the primary-side control circuit;

a current operation circuit, electrically connected to the voltage operation circuit and the primary-side control circuit, and configured to calculate the excitation current $I_{m.est}$ and the primary-side current $I_{pri.est}$ based on the excitation voltage $V_{m.est}$ and the excitation inductance $L_{m.est}$ that is calculated by the primary-side control circuit; and an output voltage-current operation circuit, electrically connected to the voltage operation circuit, the current operation circuit, and the primary-side control circuit, and configured to calculate the output voltage $V_{o.est}$ and the output current $I_{o.est}$ of the resonant power supply based on the excitation voltage $V_{m.est}$ and the primary-side current $I_{pri.est}$.

6. The resonant power supply according to claim 5, wherein the voltage operation circuit comprises:

a differentiator, electrically connected to the collection circuit, and configured to obtain a change rate of the input current $I_r$;

a first operational amplifier, electrically connected to the differentiator and the primary-side control circuit, and configured to multiply the change rate of the input current I, by the leakage inductance $L_{lk1}$ of the primary-side winding to obtain $L_{lk1} \times (dI_r/dt)$; and a second operational amplifier, electrically connected to the first operational amplifier and the collection circuit, and configured to calculate a difference between the input voltage $V_t$ and the $L_{lk1}(dI_r/dt)$ output by the first operational amplifier, and use the difference as the excitation voltage $V_{m.est}$.

7. The resonant power supply according to claim 6, wherein the current operation circuit comprises:

a third operational amplifier, electrically connected to the second operational amplifier and the primary-side control circuit, and configured to obtain a product of a reciprocal of the excitation inductance $L_{m.est}$ calculated by the primary-side control circuit and the excitation voltage $V_{m.est}$;

an integrator, electrically connected to the third operational amplifier, and configured to perform integration on the excitation voltage $V_{m.est}$ to obtain the excitation current $I_{m.est}$; and a fourth operational amplifier, electrically connected to the integrator and the collection circuit, and configured to calculate a difference between the input current $I_r$ and the excitation current $I_{m.est}$ and use the difference as the primary-side current $I_{pri.est}$.

8. The resonant power supply according to claim 7, wherein the output voltage-current operation circuit comprises:

a fifth operational amplifier, electrically connected to the second operational amplifier and configured to calculate an absolute value $|V_{m.est}|$ of the excitation voltage $V_{m.est}$;

a first low-pass filter, electrically connected to the fifth operational amplifier, and configured to calculate an average value $|V_{m.est}|_{avg}$ of the absolute value $|V_{m.est}|$ of the excitation voltage $V_{m.est}$;

a sixth operational amplifier, electrically connected to the fourth operational amplifier, and configured to calculate an absolute value $|I_{pri.est}|$ of the primary-side current $I_{pri.est}$;

a second low-pass filter, electrically connected to the sixth operational amplifier, and configured to calculate an average value $|I_{pri.est}|_{avg}$ of the absolute value $|I_{pri.est}|$ of the primary-side current $I_{pri.est}$; and an operational processing circuit, electrically connected to the fifth operational amplifier, the first low-pass filter, the sixth operational amplifier, and the second low-pass filter, wherein when the primary-side control circuit determines that $f_{sw} \geq f_r$, the operational processing circuit is configured to calculate the output voltage $V_{o.est}$ and the output current $I_{o.est}$ of the resonant power supply based on an average value $|V_{m.est}|_{avg}$ of the absolute value $|V_{m.est}|$ of the excitation voltage $V_{m.est}$ in the current switching cycle T of the bridge circuit, an average value $|I_{pri.est}|_{avg}$ of the absolute value $|I_{pri.est}|$ of the primary-side current $I_{pri.est}$ in the current switching cycle T of the bridge circuit, and a ratio K of turns of the primary-side winding to the secondary-side winding, wherein $$V_{o.est} = \frac{1}{K} \times |V_{m.est}|_{avg}, \text{ and } I_{o.est} = \frac{1}{K} \times |I_{pri.est}|_{avg}.$$

or when the primary-side control circuit determines that $f_{sw} < f_r$, the operational processing circuit is configured to obtain, in a half of the current switching cycle T of the bridge circuit, a peak $|I_{pri.est}|_{max}$ of the absolute value $|I_{pri.est}|$ of the primary-side current $I_{pri.est}$ from a plurality of absolute values $|I_{pri.est}|$ of the primary-side current $I_{pri.est}$ and an absolute value $|V_{m1}|$ of an excitation voltage matching the peak $|I_{pri.est}|_{max}$, and calculate the output voltage $V_{o.est}$ and the output current $I_{o.est}$ of the resonant power supply based on the average value $|I_{pri.est}|_{avg}$ of the absolute value $|I_{pri.est}|$ of the primary-side current $I_{pri.est}$ and a ratio K of turns of the primary-side winding to the secondary-side winding of the transformer, wherein $$V_{o.est} = \frac{1}{K} \times |V_{m1}|, \text{ and } I_{o.est} = \frac{1}{K} \times |I_{pri.est}|_{avg}.$$

9. The resonant power supply according to claim 3, wherein
the primary-side control circuit is configured to output, when determining that the primary-side current $I_{pri.est}$ calculated by the feedback circuit is zero, the excitation inductance $L_{m.est}$ received by the feedback circuit in a current switching cycle T of the bridge circuit to the feedback circuit.

10. A primary-side feedback excitation power supply controller, electrically connected to a bridge circuit, an LC series resonant network, and a primary-side winding of a transformer that are in a resonant power supply, wherein the primary-side feedback excitation power supply controller is configured to:
receive an input voltage $V_t$ and an input current $I_r$ provided by the LC series resonant network;
calculate an excitation inductance $L_{m.est}$ based on the input current $I_r$; and
output a drive signal to the bridge circuit, wherein the drive signal is based on the input voltage $V_t$, the input current $I_r$, and the excitation inductance $L_{m.est}$, and wherein the drive signal is to drive the bridge circuit to convert a direct current provided by a power supply into a square wave signal.

11. The primary-side feedback excitation power supply controller according to claim 10, wherein the primary-side feedback excitation power supply controller is configured to:
calculate an output voltage $V_{o.est}$ and an output current $I_{o.est}$ of the resonant power supply based on the input voltage $V_t$, the input current $I_r$, a leakage inductance $L_{lk1}$ of the primary-side winding, and the excitation inductance $L_{m.est}$;
wherein the drive signal is further based on the output voltage $V_{o.est}$ and the output current $I_{o.est}$ of the resonant power supply.

12. The primary-side feedback excitation power supply controller according to claim 11, wherein the primary-side feedback excitation power supply controller comprises:
a collection circuit, electrically connected to the primary-side winding, and configured to collect the input voltage $V_t$ and the input current $I_r$; and
a feedback circuit, electrically connected to the collection circuit, and configured to calculate an excitation voltage $V_{m.est}$, an excitation current $I_{m.est}$, and a primary-side current $I_{pri.est}$ based on the input voltage $V_t$, the input current $I_r$, the leakage inductance $L_{lk1}$ of the primary-side winding, and the excitation inductance $L_{m.est}$, and calculate the output voltage $V_{o.est}$ and the output current $I_{o.est}$ of the resonant power supply based on the excitation voltage $V_{m.est}$ and the primary-side current $I_{pri.est}$ that are calculated, wherein $$V_{m.est} = V_t - L_{lk1}\frac{dI_r}{dt};$$

$$I_{m.est} = \frac{1}{L_{m.est}}\int V_{m.est}dt; \text{ and}$$

$$I_{pri.est} = I_r - I_{m.est};$$

and
a primary-side control circuit, electrically connected to the feedback circuit and the bridge circuit, and configured to calculate the excitation inductance $L_{m.est}$, and transmit the leakage inductance $L_{lk1}$ of the primary-side winding and the excitation inductance $L_{m.est}$ to the feedback circuit.

13. The primary-side feedback excitation power supply controller according to claim 12, wherein
an inductance value of a resonant inductor in the LC series resonant network is $L_r$, and a capacitance value of a resonant capacitor is $C_r$; the primary-side control circuit is further configured to calculate an oscillation frequency $f_r$ of the bridge circuit, wherein $$f_r = \frac{1}{2\pi\sqrt{(L_r + L_{lk1})C_r}};$$

and
that the primary-side control circuit is configured to calculate the excitation inductance $L_{m.est}$ comprises: the primary-side control circuit is configured to compare a working frequency $f_{sw}$ of the bridge circuit with the oscillation frequency $f_r$, and compare, when $f_{sw}<f_r$, in a collection phase $T_{cal}$ in one switching cycle T of the bridge circuit, an absolute value $|I_{m.est}|$ of the excitation current $I_{m.est}$ calculated by the feedback circuit in the current switching cycle T of the bridge circuit with an absolute value $|I_r|$ of the input current $I_r$,
increase, when $|I_{m.est}|>|I_r|$, the excitation inductance $L_{m.est}$ received by the feedback circuit in the current switching cycle T of the bridge circuit, to achieve $|I_{m.est}|=|I_r|$, and output the increased excitation inductance $L_{m.est}$ to the feedback circuit;
decrease, when $|I_{m.est}|<|I_r|$, the excitation inductance $L_{m.est}$ received by the feedback circuit in the current switching cycle T of the bridge circuit, to achieve $|I_{m.est}|=|I_r|$, and output the decreased excitation inductance $L_{m.est}$ to the feedback circuit; and
output, when $|I_{m.est}|=|I_r|$, the excitation inductance $L_{m.est}$ received by the feedback circuit in the current switching cycle T of the bridge circuit to the feedback circuit, wherein $$T_{cal}=T/2-T_r/2, \text{ and } T_r=1/f_r.$$

14. The primary-side feedback excitation power supply controller according to claim 13, wherein the feedback circuit comprises:
a voltage operation circuit, electrically connected to the collection circuit and the primary-side control circuit, and configured to calculate the excitation voltage $V_{m.est}$ based on the input voltage $V_t$, the input current $I_r$, and the leakage inductance $L_{lk1}$ of the primary-side winding provided by the primary-side control circuit;
a current operation circuit, electrically connected to the voltage operation circuit and the primary-side control circuit, and configured to calculate the excitation current $I_{m.est}$ and the primary-side current $I_{pri.est}$ based on the excitation voltage $V_{m.est}$ and the excitation inductance $L_{m.est}$ that is calculated by the primary-side control circuit; and
an output voltage-current operation circuit, electrically connected to the voltage operation circuit, the current operation circuit, and the primary-side control circuit, and configured to calculate the output voltage $V_{o.est}$ and the output current $I_{o.est}$ of the resonant power supply based on the excitation voltage $V_{m.est}$ and the primary-side current $I_{pri.est}$.

15. The primary-side feedback excitation power supply controller according to claim 14, wherein the voltage operation circuit comprises:
- a differentiator, electrically connected to the collection circuit, and configured to obtain a change rate of the input current $I_r$;
- a first operational amplifier, electrically connected to the differentiator and the primary-side control circuit, and configured to multiply the change rate of the input current $I_r$ by the leakage inductance $L_{lk1}$ of the primary-side winding to obtain $L_{lk1}(dI_r/dt)$; and
- a second operational amplifier, electrically connected to the first operational amplifier and the collection circuit, and configured to calculate a difference between the input voltage $V_t$ and the $L_{lk1} \times (dI_r/dt)$ output by the first operational amplifier, and use the difference as the excitation voltage $V_{m.est}$.

16. The primary-side feedback excitation power supply controller according to claim 12, wherein that the primary-side control circuit is configured to calculate the excitation inductance $L_{m.est}$ comprises:
the primary-side control circuit is configured to output, when determining that the primary-side current $I_{pri.est}$ calculated by the feedback circuit is zero, the excitation inductance $L_{m.est}$ received by the feedback circuit in a current switching cycle T of the bridge circuit to the feedback circuit.

17. A control method, applied to a primary-side feedback excitation power supply controller, the method comprising:
- receiving, by the primary-side feedback excitation power supply controller, an input voltage $V_t$ and an input current $I_r$ that are provided by an LC series resonant network, wherein the primary-side feedback excitation power supply controller is electrically connected to a bridge circuit, the LC series resonant network, and a primary-side winding of a transformer that are in a resonant power supply;
- outputting, by the primary-side feedback excitation power supply controller, a drive signal to the bridge circuit in response to receiving the input voltage $V_t$ and the input current $I_r$;
- driving the bridge circuit, based on the drive signal, to convert a direct current provided by a power supply into a square wave signal;
- calculating an excitation inductance $L_{m.est}$;
- calculating an output voltage $V_{o.est}$ and an output current $I_{o.est}$ of the resonant power supply based on the input voltage $V_t$, the input current $I_r$, a leakage inductance $L_{lk1}$ of the primary-side winding, and the excitation inductance $L_{m.est}$; and
- outputting the drive signal to the bridge circuit.

18. A control apparatus, comprising:
a load; and
a resonant power supply electrically connected to the load, wherein the resonant power supply further comprises:
- a transformer, comprising a primary-side winding and a secondary-side winding;
- a bridge circuit, electrically connected to a power supply, and configured to convert, based on a drive signal, a first direct current provided by the power supply into a square wave signal;
- an LC series resonant network, electrically connected to the bridge circuit and the primary-side winding, and configured to convert the square wave signal into a first alternating current, and output the first alternating current to the primary-side winding, wherein the first alternating current comprises an input voltage $V_t$ and an input current $I_r$;
- a rectifier bridge, electrically connected to the secondary-side winding, and configured to convert a second alternating current produced on the secondary-side winding into a second direct current; and
- a primary-side feedback excitation power supply controller, electrically connected to the primary-side winding, the bridge circuit, and the LC series resonant network, and configured to:
  - receive the input voltage $V_t$ and the input current $I_r$;
  - calculate an excitation inductance $L_{m.est}$ based on the input current $I_r$; and
  - output the drive signal to the bridge circuit, wherein the drive signal is based on the input voltage $V_t$, the input current $I_r$, and the excitation inductance $L_{m.est}$.

19. A non-transitory computer readable storage medium, comprising computer instructions stored thereon which, when executed by a primary-side feedback excitation power supply controller, cause the primary-side feedback excitation power supply controller to:
- receive an input voltage $V_t$ and an input current $I_r$ that are provided by an LC series resonant network electrically connected to the primary-side feedback excitation power supply controller;
- calculate an excitation inductance $L_{m.est}$;
- calculate an output voltage $V_{o.est}$ and an output current $I_{o.est}$ of a resonant power supply based on the input voltage $V_t$, the input current $I_r$, a leakage inductance $L_{lk1}$ of a primary-side winding of a transformer in the resonant power supply, and the excitation inductance $L_{m.est}$, wherein the primary-side feedback excitation power supply controller is electrically connected to the primary-side winding; and
- output a drive signal to a bridge circuit that is electrically connected to the primary-side feedback excitation power supply controller, wherein the drive signal is for driving the bridge circuit to convert a direct current provided by a power supply into a square wave signal.

20. A computer program product, comprising computer instructions stored on a non-transitory computer readable storage medium, wherein when the computer instructions are run on a primary-side feedback excitation power supply controller, the primary-side feedback excitation power supply controller configured to:
- receive an input voltage $V_t$ and an input current $I_r$ that are provided by an LC series resonant network electrically connected to the primary-side feedback excitation power supply controller;
- calculate an excitation inductance $L_{m.est}$;
- calculate an output voltage $V_{o.est}$ and an output current $I_{o.est}$ of a resonant power supply based on the input voltage $V_t$, the input current $I_r$, a leakage inductance $L_{lk1}$ of a primary-side winding of a transformer in the resonant power supply, and the excitation inductance $L_{m.est}$, wherein the primary-side feedback excitation power supply controller is electrically connected to the primary-side winding; and
- output a drive signal to a bridge circuit that is electrically connected to the primary-side feedback excitation power supply controller, wherein the drive signal is for driving the bridge circuit to convert a direct current provided by a power supply into a square wave signal.

* * * * *